US012626497B2

(12) United States Patent
Onishi

(10) Patent No.: US 12,626,497 B2
(45) Date of Patent: May 12, 2026

(54) INFORMATION PROCESSING DEVICE FOR SELECTIVELY TRANSMITTING IMAGE DATA TO BE SORTED TO A NETWORK

(71) Applicant: HUTZPER INC., Osaka (JP)

(72) Inventor: Hiro Onishi, Osaka (JP)

(73) Assignee: HUTZPER INC., Osaka (JP)

( * ) Notice: Subject to any disclaimer, the term of this patent is extended or adjusted under 35 U.S.C. 154(b) by 384 days.

(21) Appl. No.: 18/256,040

(22) PCT Filed: Dec. 7, 2021

(86) PCT No.: PCT/JP2021/045008
§ 371 (c)(1),
(2) Date: Jun. 5, 2023

(87) PCT Pub. No.: WO2022/124316
PCT Pub. Date: Jun. 16, 2022

(65) Prior Publication Data
US 2024/0104911 A1 Mar. 28, 2024

(30) Foreign Application Priority Data

Dec. 8, 2020 (JP) ................................. 2020-203752

(51) Int. Cl.
*G06V 10/82* (2022.01)
*G06V 10/10* (2022.01)

(52) U.S. Cl.
CPC .............. *G06V 10/82* (2022.01); *G06V 10/10* (2022.01)

(58) Field of Classification Search
None
See application file for complete search history.

(56) References Cited

U.S. PATENT DOCUMENTS 8,761,490 B2 * 6/2014 Scheid ............... G01N 21/8851
382/145
10,964,011 B2 * 3/2021 Cosatto ................. G06T 7/0014
(Continued)

FOREIGN PATENT DOCUMENTS

JP 2019-139316 A 8/2019
JP 2020-148621 A 9/2020
(Continued)

OTHER PUBLICATIONS

Wilson, Duncan John. Classification of defects using uncertainty techniques in industrial web inspection. University of London, University College London (United Kingdom), 1998. (Year: 1998).*
(Continued)

*Primary Examiner* — Matthew C Bella
*Assistant Examiner* — Johnny B Duong
(74) *Attorney, Agent, or Firm* — Studebaker Brackett PLLC

(57) ABSTRACT

Disclosed herein are method, device and computer program to facilitate collaboration between different places using a network while reducing the consumption of communication resources to reduce cost. An edge device having a storage unit, a determination unit and an output control unit. The storage unit holds an AI model into which image data are sequentially input and which outputs a sorting result of each of the products. The determination unit determines whether the sorting result output from the AI model in response to the input image data satisfies a predetermined condition. When the predetermined condition is satisfied, the output control unit outputs the image data identified as being a defective product, together with a first text data indicating the determination result; and when the predetermined condition is not satisfied, the output control unit outputs a second text data indicating the determination result.

8 Claims, 13 Drawing Sheets

(56)                    References Cited

U.S. PATENT DOCUMENTS

| | | | | |
|---|---|---|---|---|
| 11,250,552 B1 * | 2/2022 | Padfield | .................. | G06N 3/045 |
| 11,551,344 B2 * | 1/2023 | Karaaslan | .................. | G06T 7/11 |
| 2022/0174912 A1 | 6/2022 | Kashimori et al. | | |
| 2022/0292397 A1 * | 9/2022 | Takahashi | .............. | G06N 3/045 |

FOREIGN PATENT DOCUMENTS

| | | | |
|---|---|---|---|
| JP | 2020-160966 A | 10/2020 | |
| JP | 2021-133955 A | 9/2021 | |
| JP | 7368834 B2 * | 10/2023 | |
| WO | 2022/124316 A1 | 6/2022 | |

OTHER PUBLICATIONS

Rosebrock, Adrian. âConvert URL to Image with Python and OpenCV.â PyImageSearch, Mar. 2, 2015, https://web.archive.org/web/20150305173306/https://pyimagesearch.com/2015/03/02/convert-url-to-image-with-python-and-opencv/. (Year: 2015).*
Japan Patent Office, International Search Report and Written Opinion for PCT Application No. PCT/JP2021/045008. Mail date Mar. 1, 2022.

* cited by examiner

FIG. 13

INFORMATION PROCESSING DEVICE FOR SELECTIVELY TRANSMITTING IMAGE DATA TO BE SORTED TO A NETWORK

NOTICE OF COPYRIGHTS AND TRADE DRESS

RELATED APPLICATION INFORMATION

This patent claims priority from International PCT Patent Application No. PCT/JP2021/045008, filed Dec. 7, 2021 entitled, "INFORMATION PROCESSING DEVICE", which claims priority to Japanese Patent Application No. 2020-203752, filed Dec. 8, 2020, all of which are incorporated herein by reference in their entirety.

TECHNICAL FIELD

The present invention relates to an information processing device.

BACKGROUND

Conventionally, image data captured by a camera is sent to a cloud server through a network, and the image data is sorted by an AI model on the cloud server (for example, see Patent Document 1, Japanese Unexamined Patent Application, Publication No. 2020-160966).

SUMMARY OF THE INVENTION

Problems to be Solved by the Invention

However, in this case, when the volume of image data to be sorted is large, not only is a load applied to the network, but also the network traffic increases, resulting in an increase in cost. Further, it is necessary to collect sufficient image data to construct an AI model for sorting, but such work takes a lot of time, which delays improvement in sorting accuracy. Furthermore, while articles for which image data to be sorted can be obtained are located at a production site, a location of production management is often located away from the production site, and thus it is essential to cooperate between remote locations via a network.

An object of the present invention is to reduce consumption of communication resources, reduce costs, and improve sorting accuracy while performing cooperation between different locations using a network.

Means for Solving the Problems

In order to achieve the above object, an aspect of the present invention provides an information processing device including:

a model retaining unit that retains a model to which image data regarding an article is input and from which a predetermined processing result for the article is output;

an image acquisition unit that acquires, as image data to be sorted, image data regarding an article to be processed;

a determination unit that determines whether the predetermined processing result output from the model as a result of inputting the image data to be processed to the model satisfies a predetermined condition; and an output control unit that executes control to output the image data to be processed to an external device together with a determination result when the determination unit determines that the predetermined condition is satisfied, and to output only a determination result to the external device when the determination unit determines that the predetermined condition is not satisfied.

Thus, it is possible to perform data cooperation by transmitting data for articles acquired at the production site to an external device, for example, a manager terminal or a server installed at a place for production management, using a network. Further, in an inspection task for sorting out products as an example of articles, data mainly transmitted to the network is text data indicating normal products, and thus the volume of data flowing through the network can be reduced and the load and use of communication resources can be reduced compared with a case where image data of each article is sent every time. Further, since predetermined image data to be learned, for example, only image data sorted as a defective product as a result of inspection of product is automatically collected, machine learning of the AI model can be accelerated. As a result, it is possible to reduce consumption of communication resources, reduce costs, and improve sorting accuracy while performing cooperation between different locations using a network. An information processing method and a program corresponding to the information processing device according to an aspect of the present invention are also provided as an information processing method and a program according to an aspect of the present invention.

Effects of the Invention

According to the present invention, it is possible to reduce consumption of communication resources, reduce costs, and improve sorting accuracy while performing cooperation between different locations using a network.

BRIEF DESCRIPTION OF THE DRAWINGS

FIG. 13 is a functional block diagram showing an example of a functional configuration of a server of an information processing system according to a second embodiment;

DETAILED DESCRIPTION—PREFERRED
MODE FOR CARRYING OUT THE INVENTION

Description of Apparatus

Figure 1:
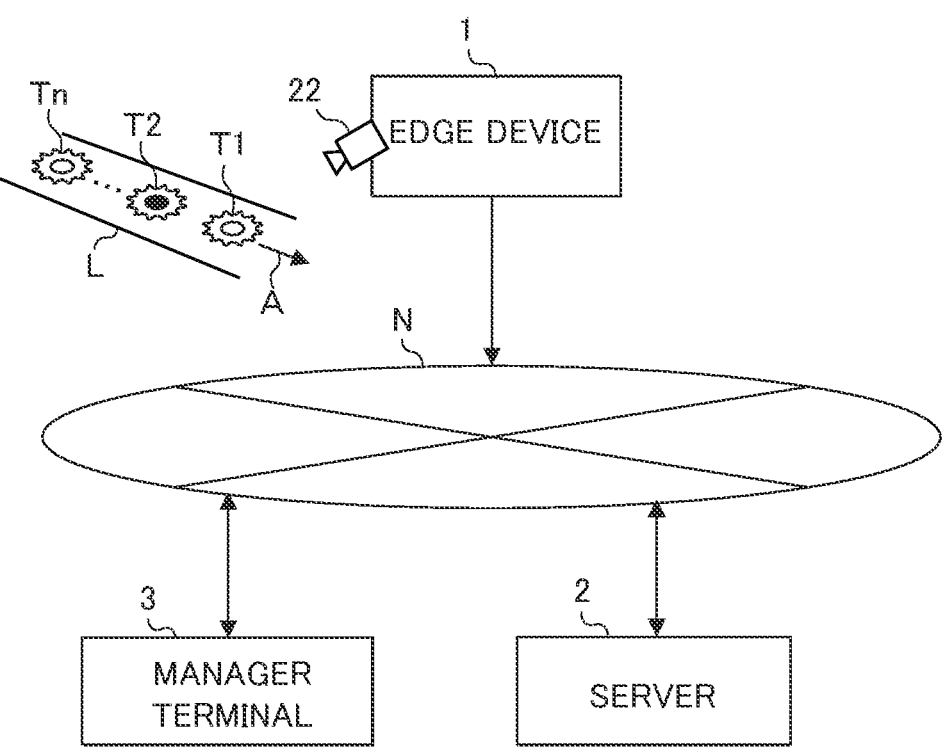
FIG. 1 is a functional block diagram showing an example of functional configurations of an edge device, a server, and a manager terminal in an information processing system according to an embodiment of the present invention.
Figure 2:
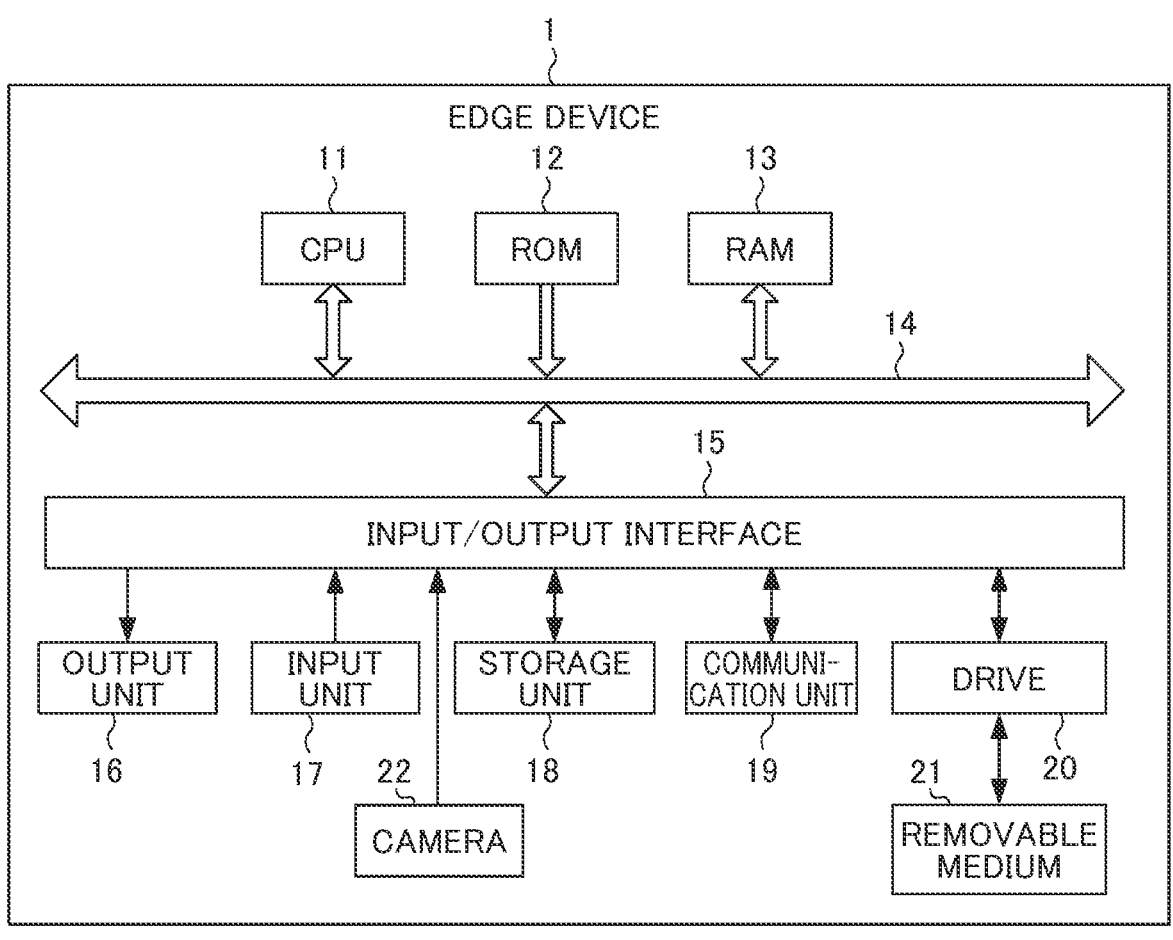
FIG. 2 is a block diagram showing a hardware configuration of the server in the information processing system of FIG. 1.
Figure 3:
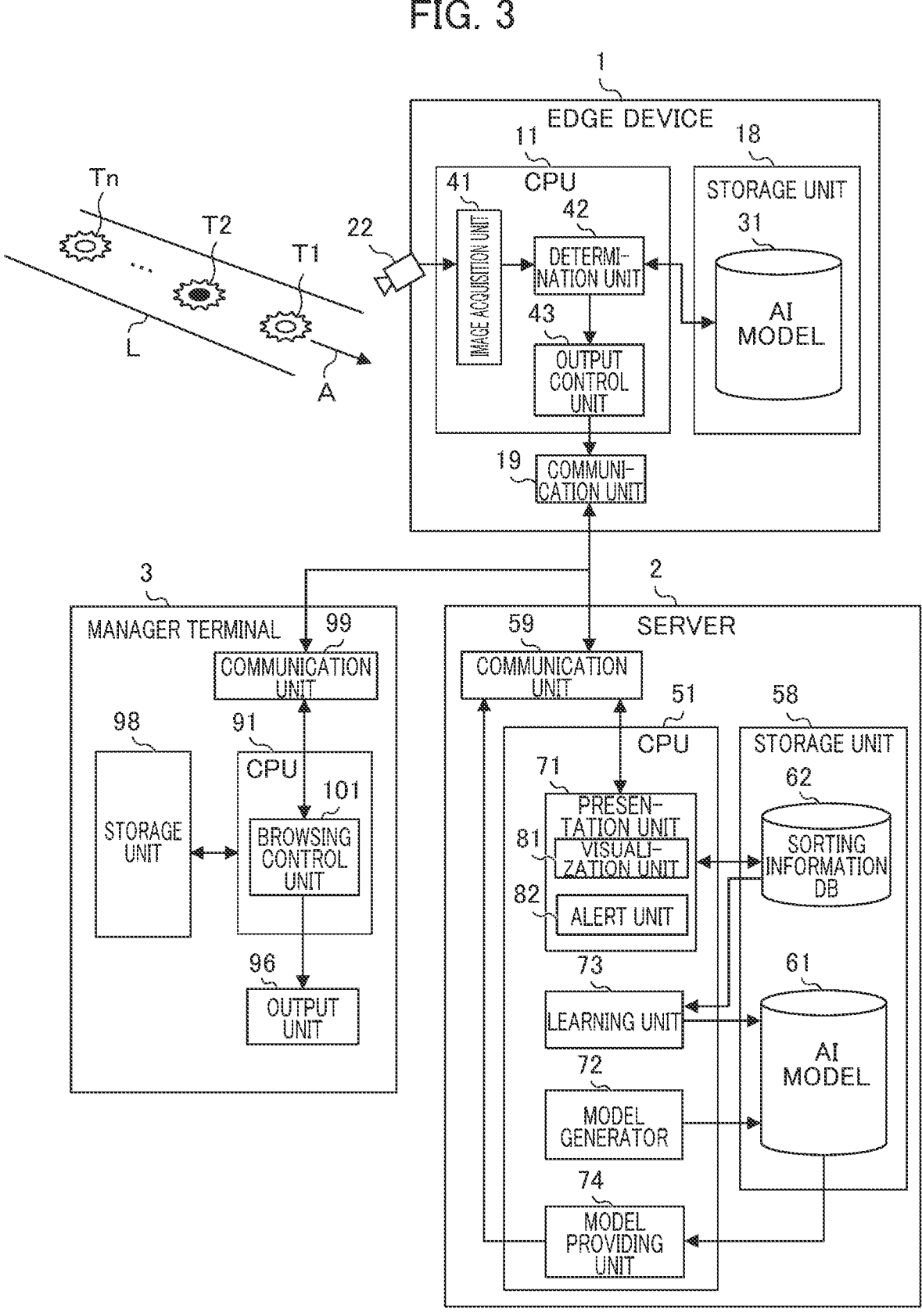
FIG. 3 is a functional block diagram showing an example of functional configurations of the edge device, the server, and the manager terminal in the information processing system of FIGS. 1 and 2.

Embodiments of the present invention will be described below with reference to the drawings. First, a configuration of an information processing system will be described with reference to FIGS. 1 to 3. FIG. 1 is a diagram showing a configuration example of an information processing system including an edge device, a server, and a manager terminal according to an embodiment of the present invention. FIG. 2 is a block diagram showing a hardware configuration of an edge device in the information processing system of FIG. 1. FIG. 3 is a functional block diagram showing an example of functional configurations of an edge device, a server, and a manager terminal in the information processing system of FIGS. 1 and 2.

In the information processing system shown in FIG. 1, an edge device 1, a server 2, and a manager terminal 3 are connected via a network N such as the Internet. The information processing system is configured such that information processing devices of the edge device 1 having a camera 22, the server 2, and the manager terminal 3 communicate with each other.

For example, when articles to be processed (for example, products T1 to Tn to be sorted) conveyed in a certain direction A on a manufacturing line L at a manufacturing site reach a predetermined position, the camera 22 is installed with an optical axis directed toward the position so as to capture images the products. The camera 22 sequentially captures images of the products T1 to Tn to be sorted one by one, and outputs image data obtained by capturing each of the images. Here, the image includes a moving image and a still image, and the moving image means a state in which a plurality of unit image groups are arranged in a time-series order. The unit image includes, for example, field and frame images. In the following example, for convenience of description, it is assumed that data of a still image including an article to be processed as a subject is output as image data from the camera 22.

The edge device 1 performs predetermined processing using an AI model on each of the image data sequentially output from the camera 22 (image data including each of the products T1 to Tn as a subject), and transmits the result of the processing to the server 2. An example of the predetermined processing includes sorting processing. The sorting processing is processing of sorting each of the products T1 to Tn conveyed in a certain direction A on the manufacturing line L into either a normal product or a defective product from the image data captured by the camera 22. As output information of the sorting result, for example, only OK (normal product) text data or a set of NG (defective product) text data and image data (image data including the defective product as a subject) is output.

The AI model is a learning model machine-learned to output predetermined output information when input information such as image data is input. Specifically, for example, the AI model of the present embodiment is a model to output the sorting result for each of the products T1 to Tn when each of the image data (image data including each of the products T1 to Tn as a subject) input sequentially from the camera 22 is input. In other words, processing of inputting the image data to the AI model and obtaining the output from the AI model is the sorting processing.

Examples of results of the sorting processing include a first type and a second type. The first type is a result that a product Tk (where k is any one of integer values of 1 to n) is a defective product. In the case of the first type, as a result of the sorting processing, image data including the product Tk as a subject is transmitted to the server 2 along with the fact that the product Tk is a defective product. On the other hand, the second type is a result that the product Tk is a normal product. In the case of the second type, as a result of the sorting processing, only the fact that the product Tk is a normal product is transmitted to the server 2.

The server 2 communicates with the edge device 1 and the manager terminal 3 to manage the edge device 1 and the manager terminal 3 and to manage information on the products T1 to Tn. Based on the sorting result received from the edge device 1, the server 2 performs alert notification to the manager terminal 3 (when the sorting result is the first type), visualization of the sorting result, and re-learning of the AI model. In the present embodiment, the server 2 is used as a cloud service on the network N that provides SaaS (Software as a Service), for example.

The manager terminal 3 is an information processing device to be operated by, for example, a manager of a manufacturing management department of a location different from the manufacturing site of the products T1 to Tn. Other servers and manager terminals are not shown, but have the same hardware configuration as the edge device 1.

An example of the sorting processing will be described below in detail. The example of the sorting processing shown herein is merely an example, and it is sufficient to employ an AI model 31 that outputs predetermined output information based on the input information. In other words, in this example, the output information of the AI model 31 is only two types of information, that is, whether the product is defective or not (normal product), but may be graded (three or more types), for example, a confidence level of 80% or more, a confidence level of less than 80% and more than 60%, and a confidence level of 60% or less without being particularly limited thereto.

In other words, when the image data including the product Tk as a subject is input, the AI model 31 may sort the product Tk into any one of M kinds (M is an arbitrary integer value of 2 or more, and is 2 in this example) of categories that have been divided in advance, and may output the sorting result.

The operation of the information processing system will be described below. The information processing system sorts the image data of each of one or more products T1 to Tn captured by the camera 22 into any one of N kinds (two kinds of a defective product category and a normal product category in this example) of categories using the AI model 31 in the edge device 1.

During the sorting of the image data, when the image data is sorted into the normal product category which occupies most of the products T1 to Tn conveyed on the manufacturing line L, only text data (for example, OK) indicating that the image data is a normal product is transmitted from the edge device 1 to the server 2 on the network N.

On the other hand, when the image data is sorted into the defective product category, the image data and text data (for example, NG) indicating that the product (for example, product T2 in the example of FIG. 1) included as a subject in the image data is a defective product are transmitted from the edge device 1 to the server 2 on the network N.

Thus, only the image data belonging to the category of the defective products, which are fewer in number than the normal products, is transmitted to the server 2 through the network N. As a result, the volume of data flowing through the network N decreases, and the amount of communication resources used can be reduced.

In the information processing system, the image data received by the server 2 is used for re-learning of an AI model 61 retained by the server 2. Thus, image data can be automatically collected for learning, and used for re-learning of the AI model 61, whereby a determination ability can be improved and thus sorting accuracy can be improved. For example, at the manufacturing site where articles are manufactured, since efforts are made to eliminate defective products in the course of manufacturing the articles, NG products are rarely generated, and accordingly it is difficult to collect NG image data. Therefore, it is difficult to make the AI model 31 learn the image data of many NG products, and it is difficult to improve the sorting accuracy. By using the mechanism of the present embodiment, since only the image data sorted under predetermined conditions are successively collected in the server 2, when the AI model 61 in the server 2 is re-learned using the collected image data, the AI model 61 becomes smarter and smarter. The AI model 61 subjected to learning is transferred from the server 2 to the edge device 1 at the manufacturing site, and is utilized as the AI model 31 for article sorting, whereby article sorting accuracy can be improved.

Furthermore, the server 2 visualizes the data for the received sorting result (data including the normal products and the defective products). Thus, since the manager can confirm with the manager terminal 3 when and where the abnormality has occurred, it is possible to prevent AI from becoming a black box.

In addition, when the server 2 detects defective products by receiving the determination result from the edge device 1, the server 2 outputs an alert to the manager terminal 3 or the like. Thus, the manager who operates the manager terminal 3 can confirm that the defective products have been detected without going to the site. In this way, a cooperation between the manufacturing site (the place where the edge device 1 is arranged) and the production management department (the department to which the manager belongs) can be strengthened while being remote. When the defective products are detected in the edge device 1, an alert may be output from the edge device 1 to a PLC (Programmable Logic Controller) at the manufacturing site. In this case, it is possible to quickly cope with the defective products at the manufacturing site.

FIG. 3 is a block diagram showing a hardware configuration of the edge device 1 in the information processing system of FIG. 2.

The edge device 1 includes a CPU (Central Processing Unit) 11, a ROM (Read Only Memory) 12, a RAM (Random Access Memory) 13, a bus 14, an input/output interface 15, an output unit 16, an input unit 17, a storage unit 18, a communication unit 19, and a drive 20.

The CPU 11 executes various kinds of processing in accordance with a program stored in the ROM 12 or a program loaded from the storage unit 18 into the RAM 13. The RAM 13 stores data necessary for the CPU 11 to execute various kinds of processing as appropriate.

The CPU 11, the ROM 12, and the RAM 13 are connected to one another via the bus 14. The input/output interface 15 is also connected to the bus 14. The output unit 16, the input unit 17, the storage unit 18, the communication unit 19, the drive 20, and the camera 22 are connected to the input/output interface 15.

The output unit 16 is configured with, for example, a display and a speaker, and outputs various information as images and sounds. The input unit 17 is configured by, for example, a keyboard and a mouse, and inputs various information. The camera 22 is arranged at a predetermined position on the manufacturing line L (see FIG. 3) where the products T1 to Tn are manufactured, and captures images of each of the products T1 to Tn flowing on the manufacturing line so as to be included in a subject.

The storage unit 18 is configured with, for example, a hard disk and a DRAM (Dynamic Random Access Memory), and stores various kinds of data. The communication unit 19 communicates with other devices (the server 2 and the manager terminal 3 in the example of FIG. 1) via the network N including the Internet. MQTT communication is used for a communication protocol in the communication unit 19. Since the MQTT communication is lighter in processing compared with general HTTP communication, even when communication lines of a large number of edge devices 1 are bundled and connected simultaneously in order to monitor a large number of manufacturing lines, a large number of edge devices 1 can be stably operated.

A removable medium 21 constituted by a magnetic disk, an optical disk, a magneto-optical disk, or a semiconductor memory is appropriately mounted on the drive 20. A program read from the removable medium 21 by the drive 20 is installed in the storage unit 18 as necessary. Further, the removable medium 21 can also store various kinds of data stored in the storage unit 18, in the same manner as the storage unit 18. Information processing devices such as other servers 2 and manager terminals 3 have the same hardware configuration as the edge device 1.

The server 2 and the manager terminal 3 in the information processing system shown in FIG. 2 basically have the same hardware configuration as the edge device 1 shown in FIG. 2. Although not shown in FIG. 2, some of the hardware configurations of the server 2 include a CPU 51, a storage unit 58, and a communication unit 59 in FIG. 3.

Further, some of the hardware configurations of the manager terminal 3 include a CPU 91, an output unit 96, a storage unit 98, and a communication unit 99. In the CPU 91 of the manager terminal 3, a browsing control unit 101 functions during execution of processing. The browsing control unit 101 accesses the server 2, and displays my page for member on a screen. Thus, the manager can browse my page.

An example of the functional configurations of the edge device 1, the server 2, and the manager terminal 3 of the information processing system shown in FIGS. 1 and 2 will be described below with reference to FIG. 3. FIG. 3 is a functional block diagram showing an example of the functional configurations of the edge device, the server, and the manager terminal in the information processing system shown in FIG. 2.

As shown in 3, the AI model 31 is retained (stored) in one region of the storage unit 18 of the edge device 1 shown in FIG. 2.

As described above, the AI model 31 identifies whether the image data of each of the products T1 to Tn captured by the camera 22 belongs to the normal product category or the defective product category, and outputs output information (whether it is a normal product category or a defective product category) of the identification result. In other words, the AI model 31 outputs the category, to which the article belongs, among the plurality of categories as a result of processing of the input image data.

When the processing corresponding to the information processing system in FIG. 1 is executed, an image acquisition unit 41, a determination unit 42, and output control unit 43 function in the CPU 11 of the edge device 1. The image acquisition unit 41 sequentially acquires image data of each of the products T1 to Tn captured by the camera 22.

The determination unit 42 inputs each image data acquired by the image acquisition unit 41 to the AI model 31, determines whether the sorting result output from the AI model 31 satisfies a predetermined condition, and delivers information according to the determination result to the output control unit 43. The determination unit 42 determines whether the sorting result satisfies the predetermined condition, using a condition of belonging to a predetermined category (for example, the defective product category) as a predetermined condition. In other words, according to the example described above, the determination unit 42 causes the AI model 31 to input the image data including the product Tk as a subject. When the sorting result (output) of the AI model 31 is that the product Tk is a defective product, the determination unit 42 determines that the sorting result satisfies the predetermined condition. On the other hand, when the sorting result of the AI model 31 is that the product Tk is a normal product, the determination unit 42 determines that the sorting result does not satisfy the predetermined condition.

The output control unit 43 executes control to transmit the information on the determination result of the determination unit 42 to the server 2. In other words, the determination unit 42 determines that the sorting result satisfies the predetermined condition (for example, the product T2 is a defective product), the output control unit 43 executes control to transmit, as information on the determination result, text data "NG" indicating that the product T2 is a defective product and the image data including the defective product (for example, the product T2) as a subject to the server 2. On the other hand, the determination unit 42 determines that the sorting result does not satisfy the predetermined condition (for example, the product T1 is a normal product), the output control unit 43 executes control to output, as information on the determination result, only text data "OK" indicating that the product T1 is a normal product to the server 2.

More specifically, transmission information including other data is transmitted to the server 2 together with the information on the determination result described above. For example, when the determination unit 42 determines that the product T1 is a normal product, the output control unit 43 transmits the information on the determination result, for example, the text data such as "OK", and information that can specify the product T1, for example, identification information (ID: Identification) of the product T1. Further, when the determination unit 42 determines that the product T1 is a defective product, the output control unit 43 transmits the information on the determination result, for example, a set of the text data such as "NG" and the image data including the product T2 as a subject, and information that can specify the product T2, for example, identification information (ID) of the product T2. A destination of transmission of the determination result is not limited to the server 2, and the determination result may be sent to other destinations. For example, a storage location such as a cloud service or a storage service on the network N is set as the destination, and thus the output control unit 43 executes control to upload the output information sorted by the AI model 31 to the storage location.

An AI model 61 and a database such as a sorting information DB 62 are provided in one region of the storage unit 58 of the server 2. The AI model 61 is a learned model acquired by an algorithm such as Neural Network or Deep Neural Network, and is learned, re-learned, and updated by a learning unit 73 to be described below. The AI model 61 is transferred and deployed from the server 2 to the edge device 1, and is utilized in the edge device 1 as the AI model 31 for the sorting processing.

The AI model 61 of the server 2 is a learning model subjected to machine learning so as to output predetermined output information when the input information such as image data is input, and is transferred to the edge device 1 at a predetermined timing when getting higher knowledge by re-learning. Specifically, the AI model 61 can learn based on image data belonging to the category of defective products to be sorted. The AI model 61 has the same function as the AI model 31, and, when the image data to be sorted is input, identifies whether the image data belongs to the normal product category or the defective product category, counts the number of products identified for each category, and outputs output information of the identification result (whether it is a normal product category or a defective product category).

When the information on the determination result sent from the edge device 1 indicates, for example, a normal product, the sorting information DB 62 stores, as sorting information, text data of "OK" indicating the normal product and an ID of the product sorted as the normal product in association with each other. In addition, since the information on the determination result contains a time stamp indicating a determination time, the information on the determination result is also stored in association with the ID of the product. When the information on the determination result sent from the edge device 1 indicates, for example, an unknown product or a defective product, the sorting information DB 62 stores, as sorting information, image data sorted as the unknown product or the defective product, text data of "NG" indicating that the image data is the unknown product or the defective product or of a probability value indicating a probability of the defective product, and an ID of the product sorted as the unknown product or the defective product in association with each other. In addition, since the information on the determination result contains a time stamp indicating a determination time (a detection time of a non-defective product, a defective product, or an unknown product), the information on the determination result is also stored in the sorting information DB 62 in association with the ID of the product.

When the server 2 of the information processing system executes processing for realizing the service, a presentation unit 71, a learning unit 73, a model generator 72, and a model providing unit 74 function in the CPU 51 of the server 2. The presentation unit 71 opens a service site to a member (for example, a company that manufactures the products T1 to Tn) who requests the provision of services related to the article sorting. The service site provides a member with a member page. On the member page, the member can browse information on the sorting result of image data of articles uploaded from the edge device 1 to the server 2, from the information processing device, for example, the manager terminal 3.

The presentation unit 71 includes a visualization unit 81 and an alert unit 82. The presentation unit 71 acquires the information on the sorting result uploaded from the manager terminal 3, counts and visualizes the number of the identified normal products and the number of the identified defective products, and outputs an alert. For example, the visualization unit 81 uses the image data and the sorting result to generate information on articles to be sorted, and presents the information to another information processing device (for example, the manager terminal 3). Specifically, the visualization unit 81 outputs and visualizes the information regarding the product T2, which is the information on the sorting result output from the edge device 1 (OK text data for the normal product and image data and NG text data for the defective product), to a real-time determination screen 111 (see FIG. 6) on the member's my page.

The alert unit 82 outputs an alert based on the NG text data of the defective product among the information regarding the product T2 obtained from the edge device 1. Specifically, the alert unit 82 displays alarm information indicating that the defective products have been detected on a management screen (see FIG. 6) of the member's my page or on the manager terminal 3, and thus notifies the manager that the defective product has been detected.

The model generator 72 creates the AI model 61, and stores it in the storage unit 58. Specifically, the model generator 72 employs, as a machine learning model, a general-purpose model X (see FIG. 6) including an object detection algorithm such as YOLO algorithm and an image recognition algorithm such as Resnet or VGG, inputs sample image data of a defective product to the general-purpose model X, and causes the model to learn.

The learning unit 73 inputs new image data to the AI model 61 to cause the AI model 61 to re-learn. Specifically, the learning unit 73 uses the image data and the text data of the sorting result output from the edge device 1 to cause the AI model 61 to re-learn. The model providing unit 74 provides the AI model 61 subjected to re-learning to the edge device 1. Specifically, the model providing unit 74 transmits and deploys the AI model 61 re-learned by the learning unit 73 to the edge device 1, thereby maintaining the AI model 31 of the edge device 1 always in a state of high identification ability.

As described above, according to the configuration of the information processing system of the embodiment, the AI model 61 learned by the server 2 deploys to the edge device

1, the image data is sorted by the AI model 31 in the edge device 1, the text data indicating the normal product is sent to the server 2 when the image data is sorted as a normal product, and the text data and the image data indicating the defective product is transmitted to the server 2 when the image data is sorted as a defective product, whereby the volume of data flowing through the network N decreases, the amount of communication resources used can be reduced, and costs can be reduced.

In the information processing system, the image data received by the server 2 from the edge device 1 is used for re-learning of the AI model 61 retained by the server 2, whereby the image data for learning is automatically collected and learning efficiency will be improved. Further, the re-learned AI model 61 deploys to the edge device 1, whereby the sorting ability of articles of the edge device 1 can be improved and the sorting accuracy can be improved.

In addition, the sorting result of the image data received by the server 2 is visualized and displayed on the manager terminal 3 installed at a location different from the manufacturing site to notify the manager, and thus it is possible to remotely confirm which part of the product T2, which is one of the products T1 to Tn, has an abnormality, whereby it is possible to prevent AI from becoming a black box.

In addition, the alert is output to the manager terminal 3 when a defective product is detected, whereby the manager can confirm the defective product has been detected without going to the site. In other words, the cooperation between the manufacturing site and the production management department can be strengthened while being remote. As a result, it is possible to perform a cooperation between different locations using the network N, reduce the consumption of communication resources, reduce the cost, and further improve the sorting accuracy.

Figure 4:
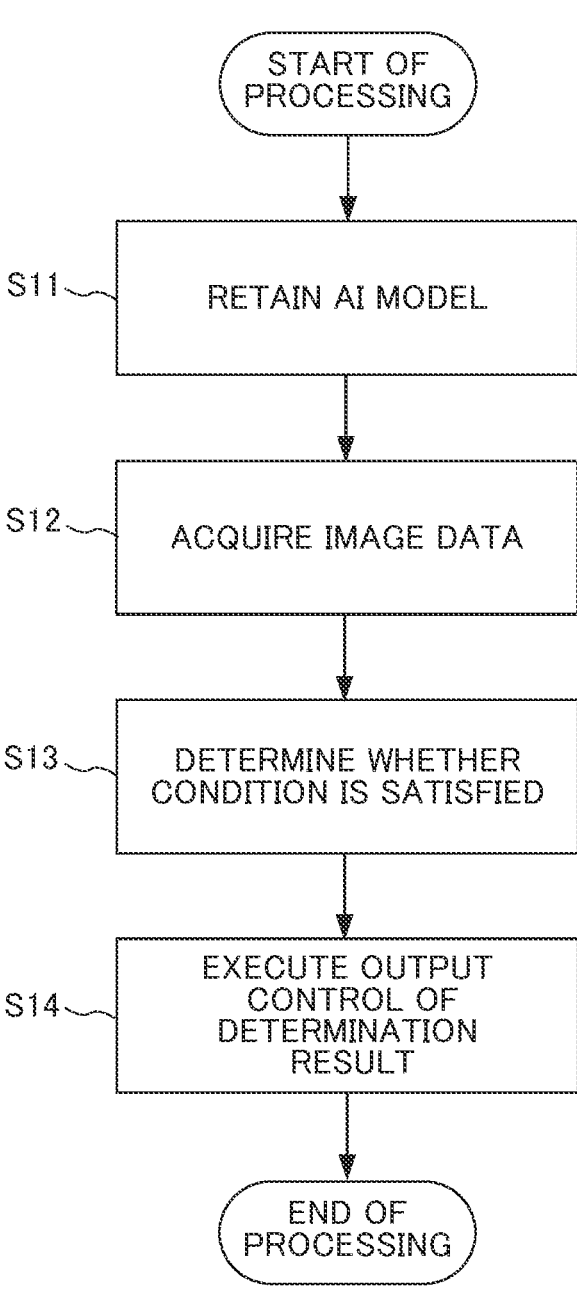
FIG. 4 is a flowchart showing an operation of the information processing system of FIGS. 1 to 3.

The operation of the information processing system according to the embodiment will be described below with reference to FIG. 4. FIG. 4 is a flowchart showing the operation of the information processing system according to the embodiment. In the case of the information processing system according to the embodiment, in step S11, the edge device 1 retains the AI model 31 that input image data regarding the products T1 to Tn to be sorted and outputs the sorting results for the products T1 to Tn to be sorted. Specifically, the model providing unit 74 of the server 2 transfers the AI model 61 retained in the server 2 to the edge device 1 instated at the manufacturing site, and stores the AI model 61 in the edge device 1.

At the manufacturing site, when the products T1 to Tn to be sorted are conveyed to the manufacturing line L and the products T1 to Tn enter a capturing range of the camera 22 in order, the product T1, the product T2, and the product T3 are captured in this order by the camera 22 and pieces of image data are sequentially input to the edge device.

In step S12, the image acquisition unit 41 of the edge device 1 acquires the image data regarding the products T1 to Tn to be sorted, as image data to be processed. Specifically, the image acquisition unit 41 acquires the image data of the products T1 to Tn that are conveyed on the manufacturing line L at the manufacturing site and are sequentially captured by the camera 22.

In step S13, the determination unit 42 inputs the image data acquired by the image acquisition unit 41 to the AI model 31, and determines whether the sorting result output from the AI model 31 based on the input of the image data satisfies a predetermined condition (for example, a condition of belonging to the category of defective products).

In step S14, the output control unit 43 executes output control of the information on the determination result of the determination unit 42. Specifically, when it is determined to satisfy a predetermined condition (for example, a condition of belonging to the category of defective products), the output control unit 43 outputs the text data "NG" indicating the determination result and the image data of the product T2, for example, the product determined to be defective, to the external device. Further, when it is determined not to satisfy a predetermined condition (for example, a condition of belonging to the category of defective products), the output control unit 43 executes control to output only the text data "OK" of the determination result to the external device. The external device is an information processing device other than the edge device 1, and is the server 2, the manager terminal 3, or the PLC installed at the manufacturing site, for example.

Figure 5:
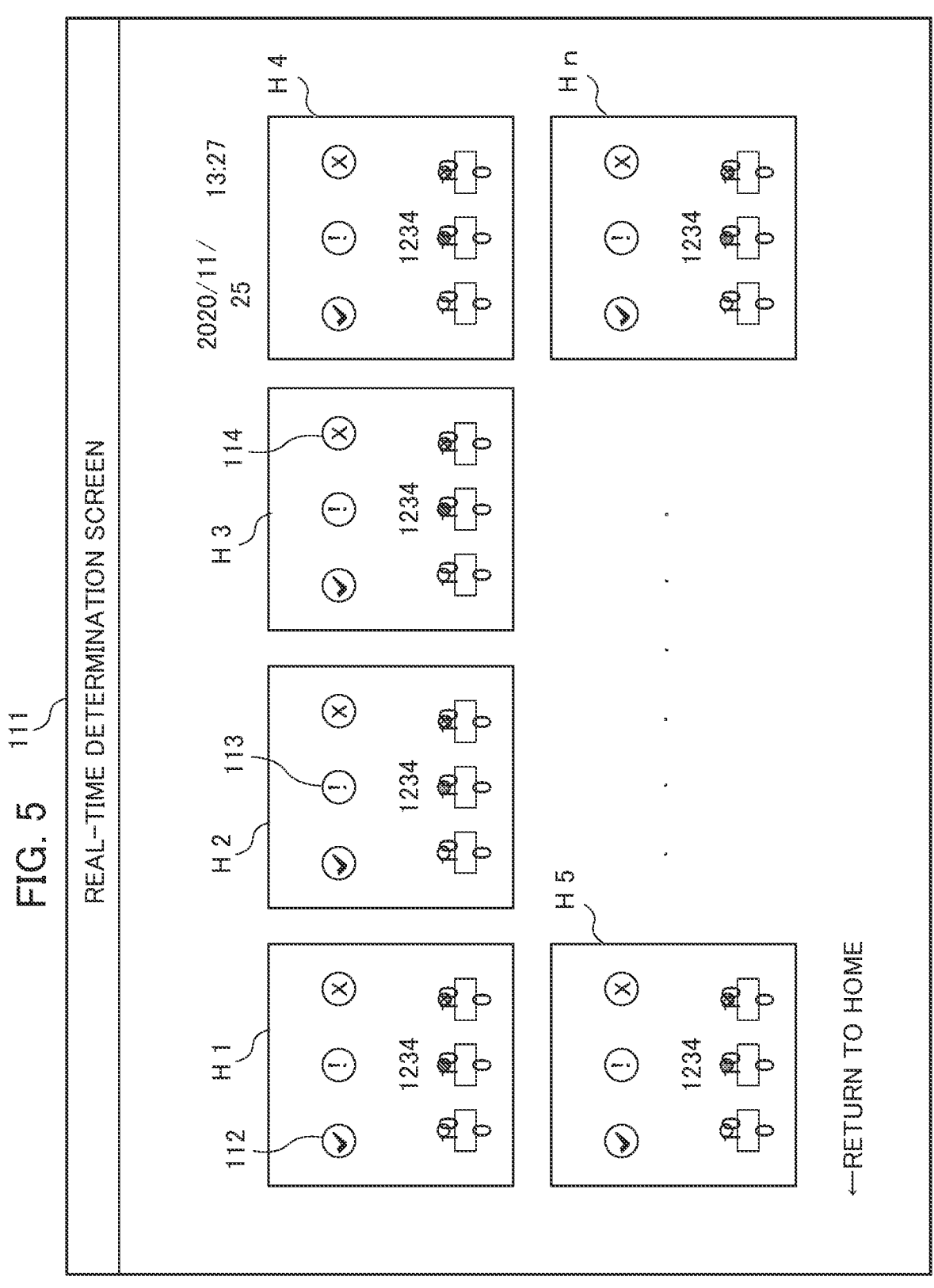
FIG. 5 is a diagram showing a real-time determination screen displayed by accessing my page of the server from the manager terminal.

For example, when the information on the determination result transmitted from the edge device 1 is received by the server 2, the visualization unit 81 visualizes the information on the determination result and displays the real-time determination screen 111 shown in FIG. 5 on the manager's my page or the screen of the manager terminal 3. On the real-time determination screen 111, the sorting result by the AI model 31 and the result of the NG determination by the determination unit 42 can be displayed in real time. Specifically, on the real-time determination screen 111, information on the sorting result of the products T1, T2, and Tn are displayed in a form of icons H1, H2, and Hn corresponding to the products T1, T2, and Tn. A check mark 112 is displayed on the icon H1, and the manager can guess that the product is a normal product "OK" when looking at the icon H1 at a glance. An exclamation mark 113 is displayed on the icon H2, and the manager can guess that the product is a cautionary product when looking at the icon H2 at a glance. An X mark 114 is displayed on the icon H3, and the manager can guess that the product is a defective product when looking at the icon H3 at a glance.

Figure 6:
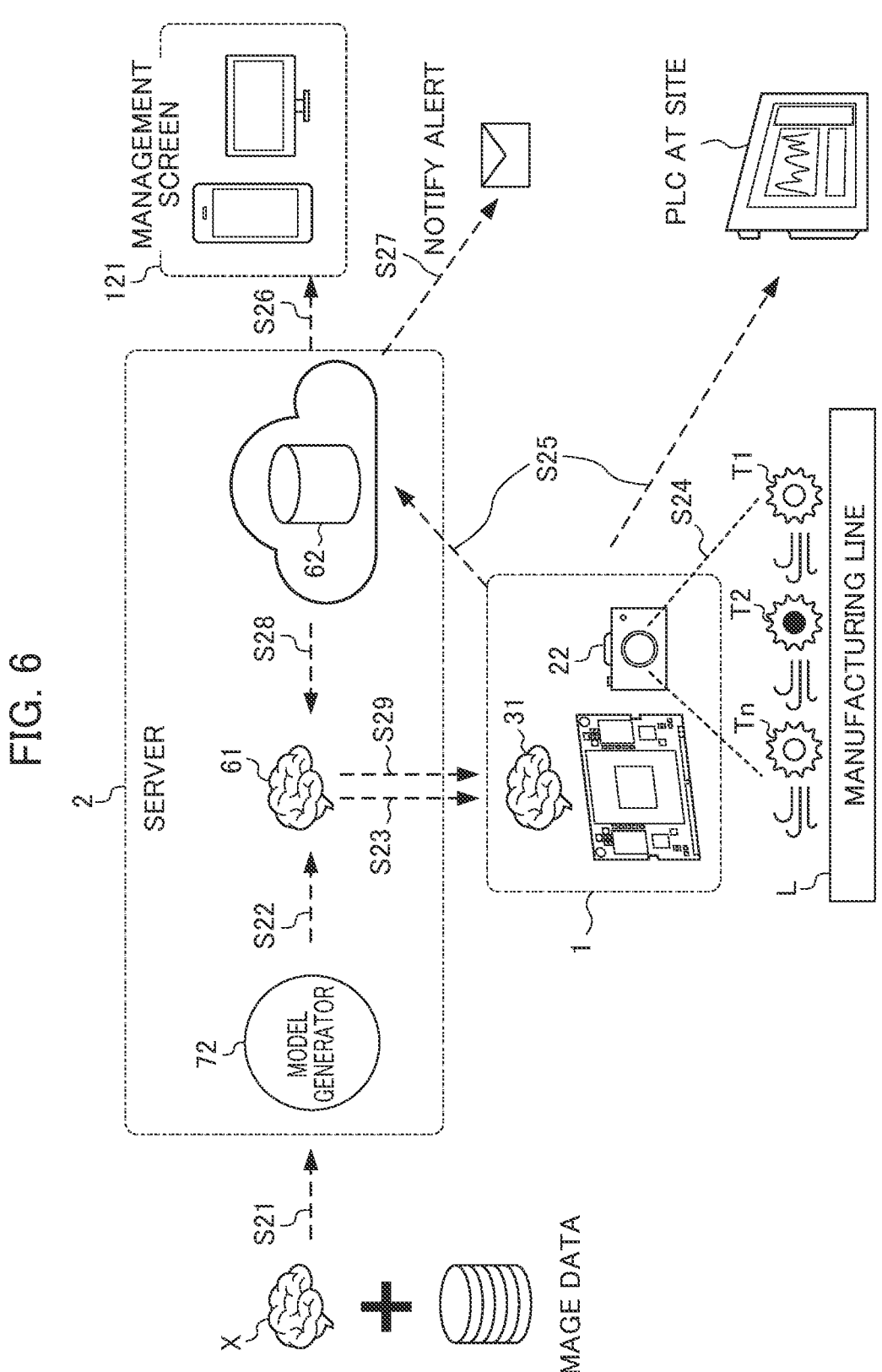
FIG. 6 is a diagram for explaining a flow of a series of processing of the information processing system.

Hereinafter, a flow of entire processing of the information processing system will be described with reference to FIG. 6. FIG. 6 is a diagram for explaining the flow of a series of processing of the information processing system. In step 21 shown in FIG. 6, the model generator 72 of the server 2 introduces a general-purpose model X and sorting target data such as sample image data of defective products of the products T1 to Tn, and creates an AI model 61 for sorting defective products from the products T1 to Tn.

In step 22, the model generator 72 compresses the created AI model 61, and retains it in the server 2.

In step 23, the AI model 61 retained in the server 2 is transferred and deployed to the edge device 1.

In step 24, the AI model 31 of the edge device 1 sorts categories of image data of the products T1 to Tn obtained by capturing the products T1 to Tn conveyed on the manufacturing line L with the camera 22. Then, whether the product is a defective product is determined based on whether the sorted category is a predetermined category, and information on the determination result is output to the on-site PLC, is uploaded to the server 2, and is stored in the sorting information DB 62. When the image data is determined to be a defective product, the image data and text data indicating the defective product are uploaded to the server 2, and when the image data is determined to be a normal product, only text data indicating the normal product is uploaded to the server 2.

In step 26, the visualization unit 81 (see FIG. 3) of the server 2 generates summary information explaining the reason for determination based on the information on the determination result, and displays (outputs) the summary information on a member's management screen 121.

In step 27, the alert unit 82 (see FIG. 3) of the server 2 confirms the information on the determination result read from the sorting information DB 62, and notifies (outputs) an alert to another information processing device (for example, the manager terminal 3) when the information on the determination result contains data indicating a defective product. A specific way of alerting may be, for example, an e-mail or the like, or a display indicating NG may be performed on the real-time determination screen 111 (see FIG. 5) of the manager's my page.

In step 28, the learning unit 73 (see FIG. 3) inputs the image data for the defective product accumulated in the sorting information DB 62 to the AI model 61 for re-learning. Thereafter, in step 29, the model providing unit 74 (see FIG. 3) of the server 2 transfers and deploys the learned AI model 61 to the edge device 1 at a predetermined timing. The predetermined timing may be, for example, a time when a transfer request is received from the edge device 1 or regular interval.

Figure 7:
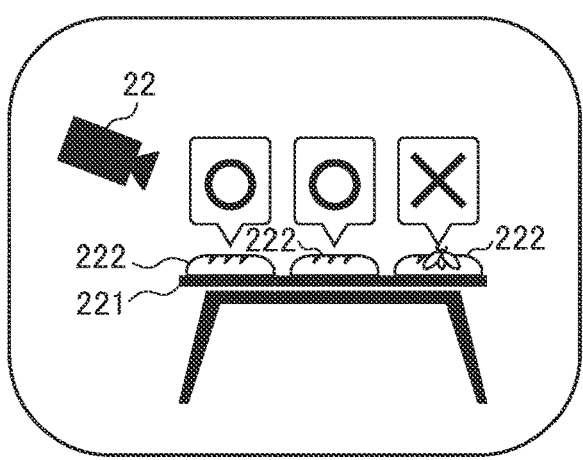
FIG. 7 is a diagram showing an example of a case in which the information processing system is applied to a check of inspection task.
Figure 8:
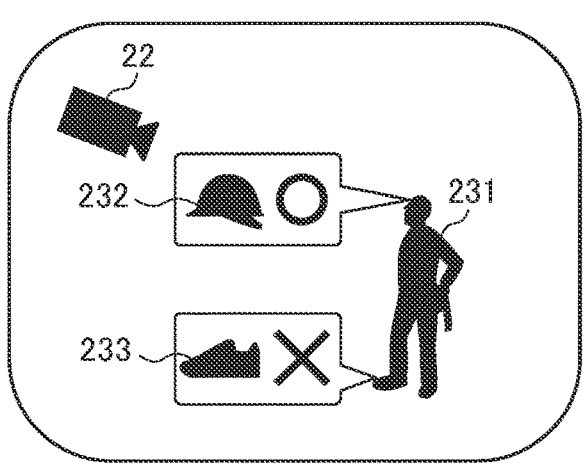
FIG. 8 is a diagram showing an example of a case in which the information processing system is applied to a check of worker's protective equipment.
Figure 9:
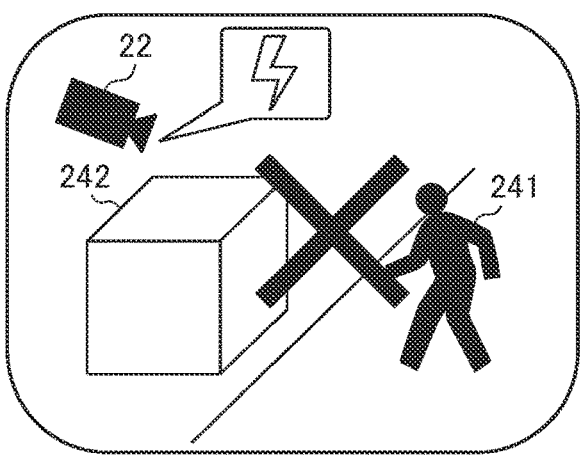
FIG. 9 is a diagram showing an example of a case in which the information processing system is applied to an alert in a dangerous area.
Figure 10:
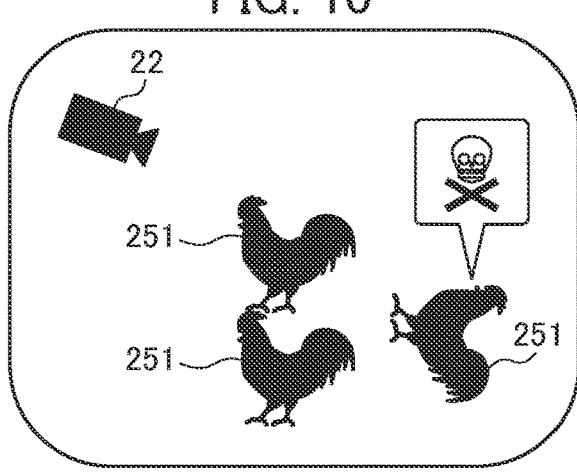
FIG. 10 is a diagram showing an example of a case in which the information processing system is applied to a check of life and death of livestock.
Figure 11:
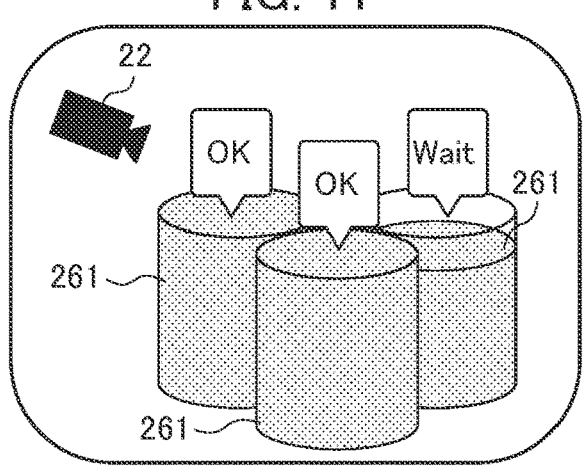
FIG. 11 is a diagram showing an example of a case in which the information processing system is applied to observation of changes over time.
Figure 12:
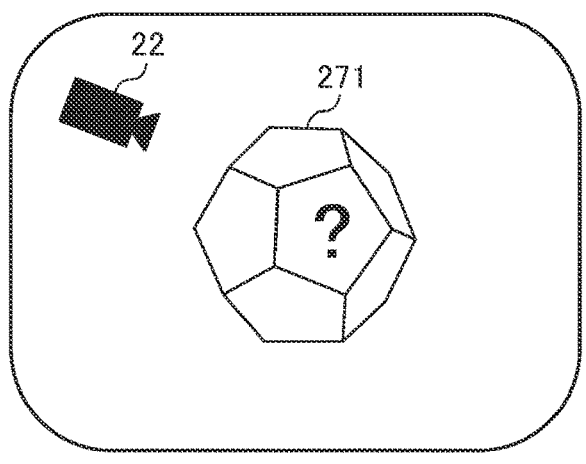
FIG. 12 is a diagram showing an example of a case in which the information processing system is utilized in response to a company's request.

An applicable example of the information processing system will be described below with reference to FIGS. 7 to 12. FIG. 7 is a diagram showing an example of a case in which the information processing system is applied to a check of inspection task. FIG. 8 is a diagram showing an example of a case in which the information processing system is applied to a check of worker's protective equipment. FIG. 9 is a diagram showing an example of a case in which the information processing system is applied to an alert in a dangerous area. FIG. 10 is a diagram showing an example of a case in which the information processing system is applied to a check of life and death of livestock. FIG. 11 is a diagram showing an example of a case in which the information processing system is applied to observation of changes over time. FIG. 12 is a diagram showing an example of a case in which the information processing system is utilized in response to a company's request.

As shown in FIG. 7, the information processing system may be applied to an inspection task in which the camera 22 captures images of articles to be sorted placed on a table 221, for example, one or more products such as bread 222 to sort defective products contained in the products or to inspect whether foreign matters are mixed in each of the products.

As shown in FIG. 8, the information processing system may be applied to a case in which the camera 22 captures an image of a worker to check equipment of a worker 231 (for example, protective equipment such as a helmet 232 or work shoes 233) and to check whether the worker is wearing appropriate equipment.

As shown in FIG. 9, the information processing system may be applied to a case in which the camera 22 captures an image of a dangerous area to monitor an entry of a person 241 into the dangerous area and changes in a dangerous substance 242 and to output an alert when the person 241 enters the dangerous area or the change of the dangerous substance 242 arises.

As shown in FIG. 10, the information processing system may be applied to a case in which the camera 22 captures images of livestock (for example, chickens 251) raised in a certain area to check life and death of the chicken 251.

As shown in FIG. 11, the information processing system may be applied to a case in which the camera 22 captures images of articles to be monitored (for example, one or more tanks 261 containing liquid) to observe changes in a color of the liquid in each of the tanks 261 over time and to output an alert when the color of the liquid in all of the tanks 261 changes to a certain color.

As shown in FIG. 12, a target 271 to be captured by the camera 22 may be determined in response to a company's request, and image data obtained by capturing the target 271 may be customized so as to be utilized by the company.

As described above, according to the operation of the information processing system of the embodiment, the edge device 1 retains the AI model 31 into which the image data of products T1 to Tn are sequentially input and form which the sorting result of each of the products T1 to Tn is output, and determines whether the sorting result output from the AI model 31 by the input of the image data satisfies the sorting condition for sorting out the defective products, for example.

As a result of the determination, when it is determined to satisfy the sorting condition, the text data "NG" indicating the determination result and the image data of the product T2, for example, the product determined to be defective are output to the server 2, and when it is determined not to satisfy the sorting condition for the defective products, only the text data "OK" of the determination result is output to the server 2.

In the server 2, the information on the determination result received from the edge device 1 is visualized and presented to the manager terminal 3, and thus a remote manager can confirm a manufacturing situation of the products T1 to Tn at the manufacturing site.

In addition, when the image data is sorted as normal products that occupy the majority of the products T1 to Tn, the image data is not sent to the server 2, whereby a load on the network N can be reduced, and the consumption of the communication resources can be reduced.

Furthermore, in the server 2, the image data of the defective products automatically collected from the edge device 1 are input to the AI model 61 for re-learning, and thus the knowledge of the AI model 61 can be improved. The learned AI model 61 is transferred to the edge device 1 and is retained as the AI model 31, whereby the sorting accuracy of the articles in the edge device 1 can be improved.

As a result, it is possible to perform a data cooperation between different locations using the network N, reduce the consumption of the communication resources, reduce costs, and improve the sorting accuracy of the articles.

Figure 13:
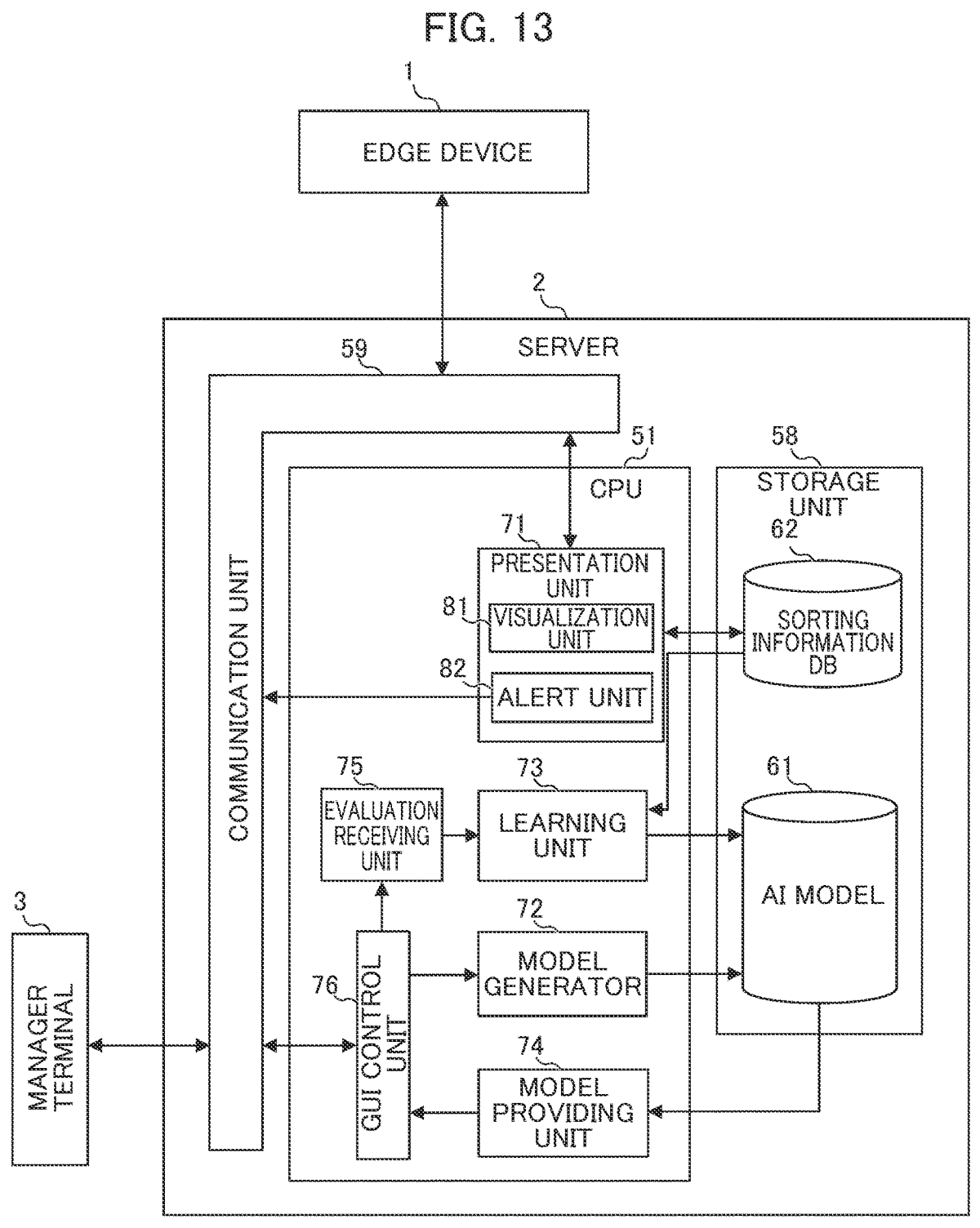
Figure 14:
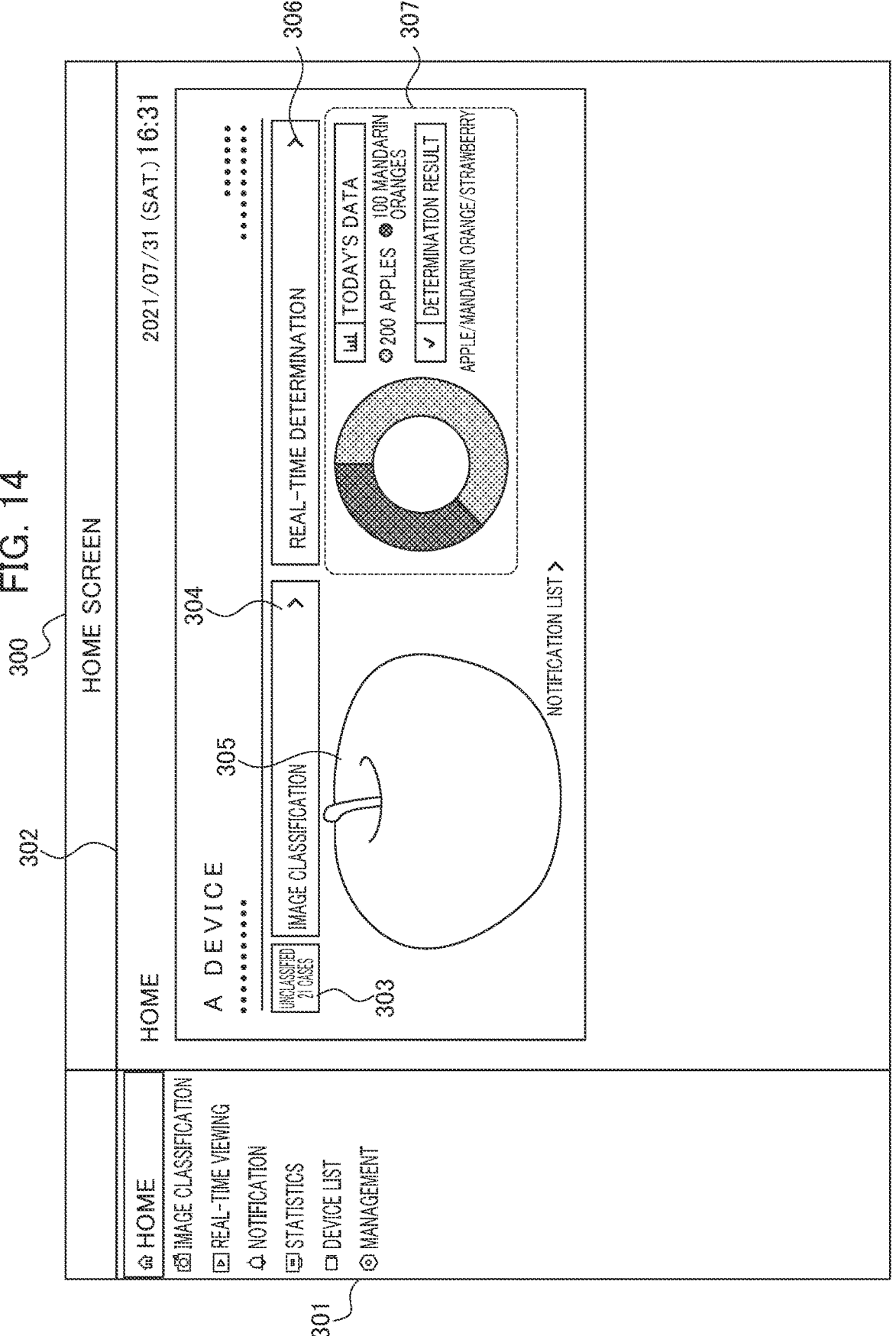
FIG. 14 is a diagram showing an example of a home screen displayed on a manager terminal of the information processing system shown in FIG. 13.
Figure 15:
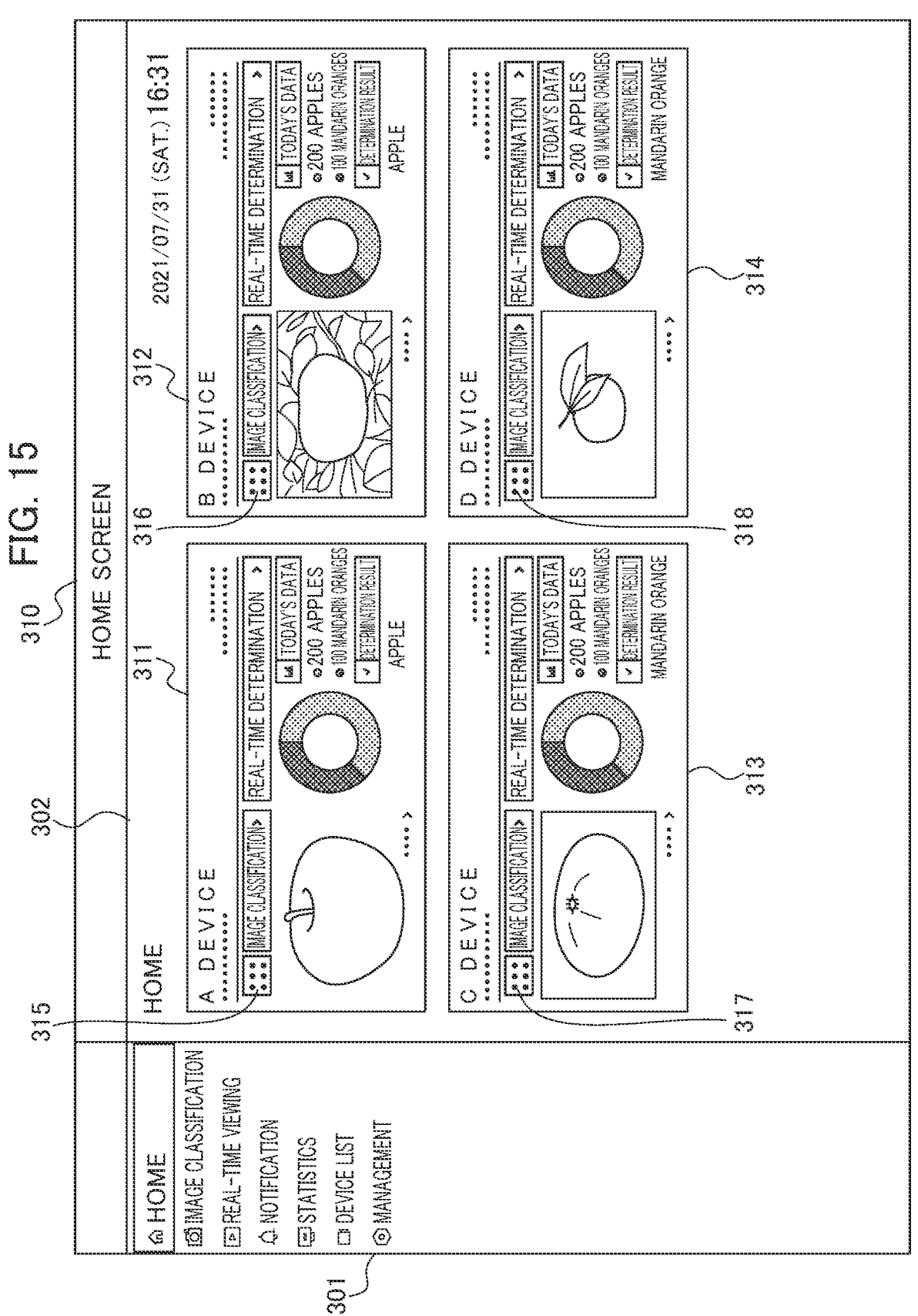
FIG. 15 is a diagram showing another example of the home screen shown in FIG. 14.
Figure 16:
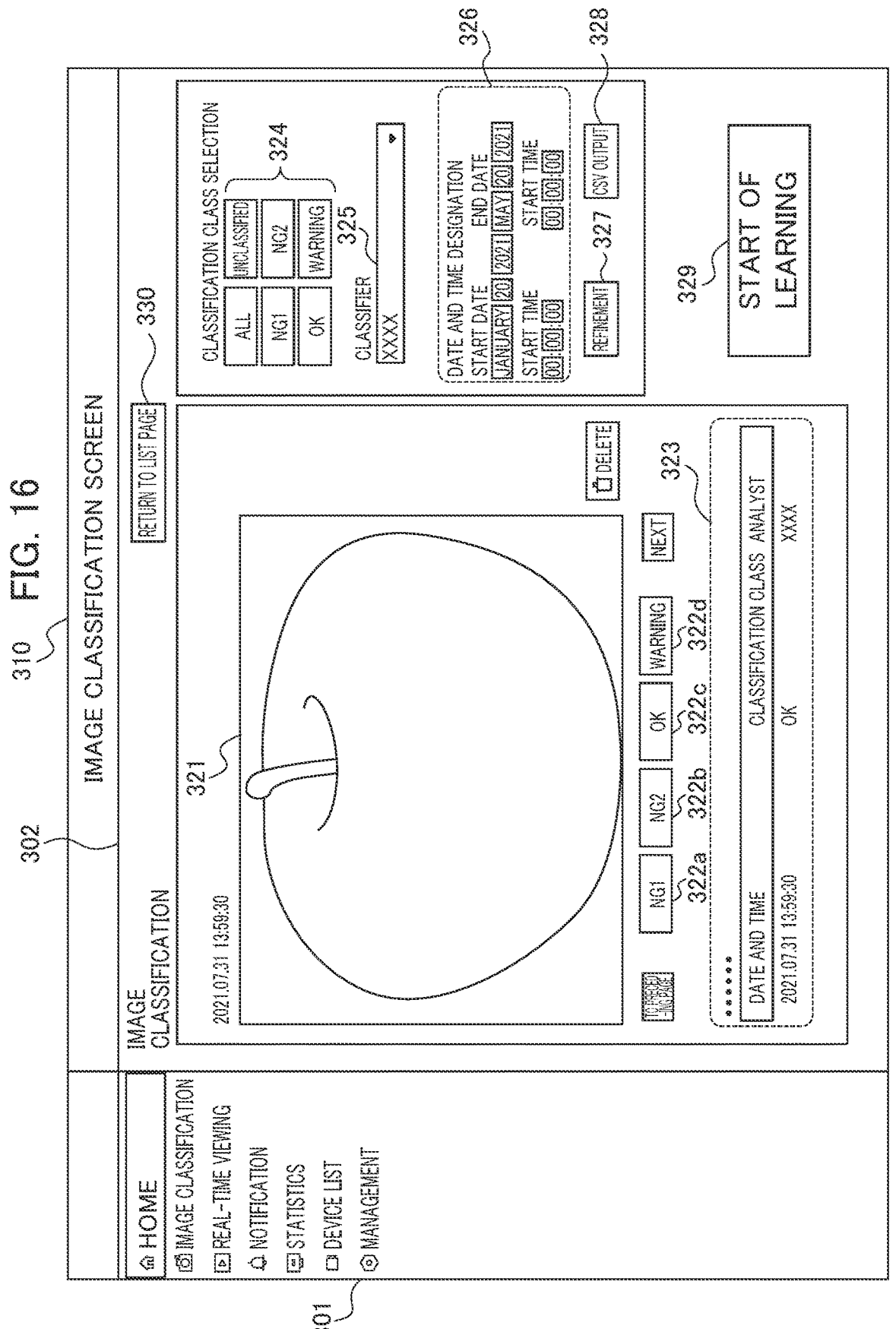
FIG. 16 is a diagram showing an example of an image classification detail screen displayed after transition from the home screen shown in FIG. 14.
Figure 17:
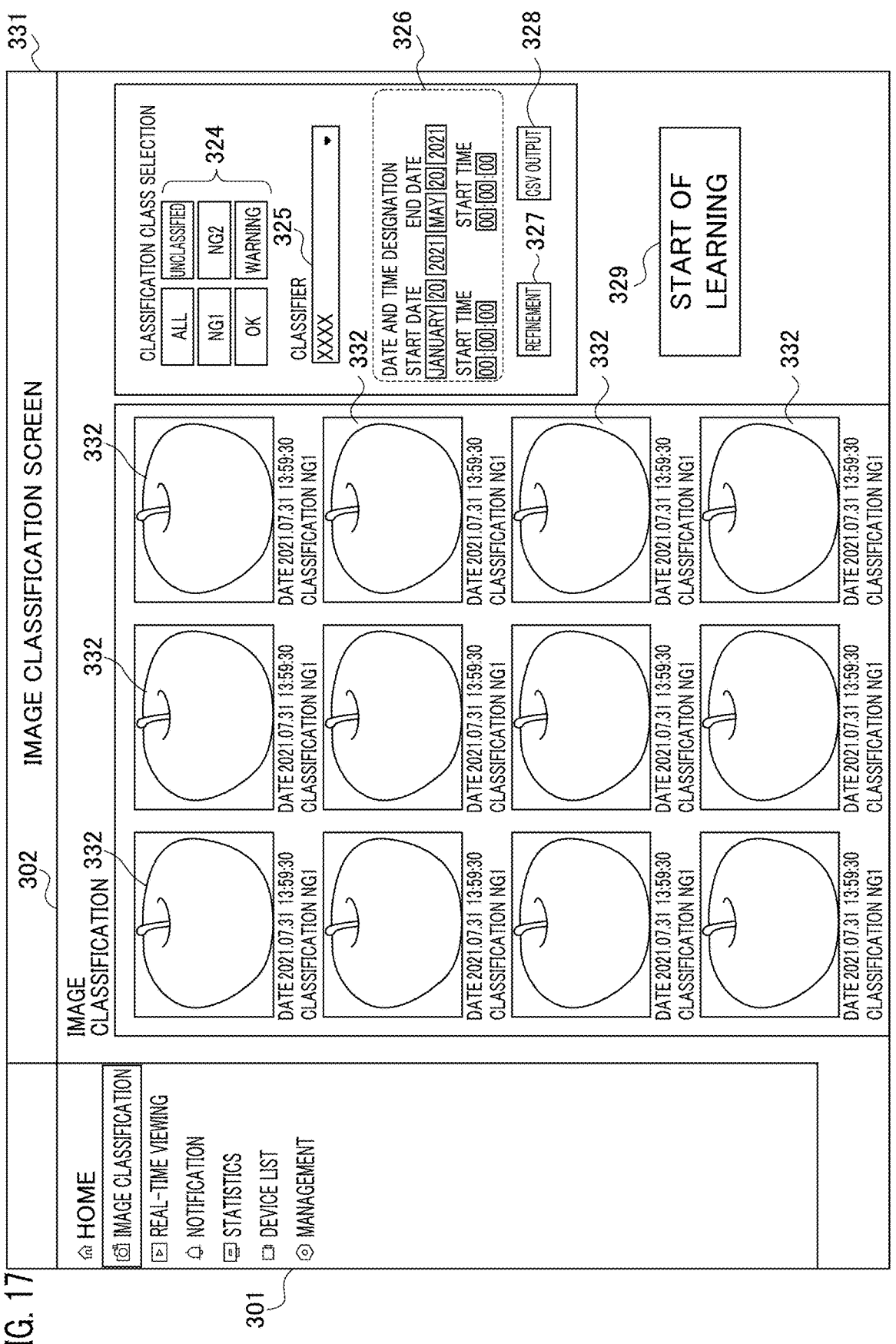
FIG. 17 is a diagram showing an example of an image classification list screen displayed after transition from the image classification detail screen shown in FIG. 16.

An information processing system according to a second embodiment will be described below with reference to FIGS. 13 to 17. FIG. 13 is a diagram showing an example of a functional configuration of a server of an information processing system according to the second embodiment. FIG. 14 is a diagram showing an example of a home screen displayed on a manager terminal of the information processing system shown in FIG. 13. FIG. 15 is a diagram showing another example of the home screen shown in FIG. 14. FIG. 16 is a diagram showing an example of an image classification detail screen displayed after transition from the home screen shown in FIG. 14. FIG. 17 is a diagram showing an example of an image classification list screen displayed after transition from the image classification detail screen shown in FIG. 16. In the description of the second embodiment with reference to FIG. 13, the same functional configurations as those of the server shown in FIG. 3 described above are denoted by the same reference numerals, and will not be described. In the second embodiment, the AI model 31 of the edge device 1 is configured to further learn for ambiguous articles that make it difficult to determine whether the articles are non-defective products or defective products and to improve sorting accuracy.

As shown in FIG. 13, a server 2 of the second embodiment includes an evaluation receiving unit 75 and a GUI control unit 76. Further, the edge device 1 includes a determination unit 42 (see FIG. 3) and an output control unit 43 (see FIG. 3).

In this case, a plurality of categories includes a first category indicating that the product is a non-defective product, a second category indicating that the product is a defective product, and a third category indicating that the product is an unknown product that makes it difficult to distinguish between the non-defective product and the defective product. Specifically, the third category is, for example, a classification in which the probability of defective products is about 50% to 70% and determination of quality is unknown. Conversely, the same is applied to a case where the probability of non-defective products is about 50% to 30%.

The determination unit 42 of the edge device 1 uses a first condition of belonging to the second category (defective product) as the predetermined condition, and determines whether the predetermined condition is satisfied. Thus, only the image data to be processed that satisfy the first condition (the condition of belonging to the second category (defective product)) is transmitted to the server 2, and the consumption of communication resources can be reduced. The determination unit 42 uses, as the predetermined condition, a second condition of belonging to the third category (for example, the determination of quality is unknown) in addition to the first condition, and determines whether the predetermined condition is satisfied.

When the determination unit 42 determines that the first condition is satisfied, the output control unit 43 outputs the image data to be processed to the external device (for example, the server 2) together with information of the second category (defective product) as the determination result. When the determination unit 42 determines that the second condition is satisfied, the output control unit 43 outputs the image data to be processed to the external device (for example, the server 2) together with information (classification label "unknown product") of the third category (for example, unknown product) as the determination result. When the determination unit 42 determines that neither the first condition and the second condition is satisfied, the output control unit 43 outputs only the determination result to the external device (for example, the server 2).

When it is determined that the second condition is satisfied, the image data to be processed is output to the external device (for example, the manager terminal 3 via the server 2) together with information of the third category (for example, unknown product) as the determination result, the image data to be processed is classified in detail by eyes of a person such as a manager, the image data to be processed is attached with a classification label again to make the AI model 61 to learn, and the learned AI model 61 is reflected to the AI model 31 of the edge device 1, whereby it is possible to reduce erroneous determination by the AI model 31 and improve the sorting accuracy.

The evaluation receiving unit 75 of the server 2 receives user's evaluation with respect to the image data to be processed and the processing result. Specifically, the evaluation receiving unit 75 receives the image data to be processed (image data attached with a classification label) and the processing result transmitted from the edge device 1, and provides the image data and the processing result to the manager terminal 3. Then, when the classification label of the image data to be processed is changed by the manager on the manager terminal 3, the evaluation receiving unit 75 receives the image data of the changed classification label.

The learning unit 73 uses the user's evaluation in addition to the image data to be processed and the processing result, and re-learns the AI model. Here, the user's evaluation is feedback of image data (training data) that has already been identified as to whether the classification label is attached again due to incorrect recognition by the AI model. In this way, the AI model re-learns using the user's evaluation in addition to the image data to be processed and the processing result, whereby a correct classification label is attached to the image data with the ambiguous determination result, and thus the sorting accuracy of non-defective products and defective products can be improved.

The GUI control unit 76 executes control to provide the manager terminal 3, which is operated by the user, with a screen that is a user interface for allowing the user to perform an operation for exhibiting the functions of the learning unit 73 and the model providing unit 74. Specifically, the GUI control unit 76 provides the manager terminal 3 with a home screen 300 shown in FIG. 14 for display.

The home screen 300 shown in FIG. 14 is a screen for the manager to browse the image data sorted by the edge device 1, and is displayed on the manager terminal 3. The home screen 300 is provided with a menu column 301 and a display column 302. The display column 302 is arranged with the name of the edge device 1 "A device", a display area 303 for the remaining number of unclassified image data acquired from the edge device 1, a button 304 for transitioning the screen to the image classification detail screen 320 (see FIG. 16) so as to classify the unclassified image data, a display area 305 for image data read out by an operation of the button 304, a button 306 for transitioning the screen to the real-time determination screen 111 (see FIG. 5), and an area 307 in which a totalized status of today's data is displayed by numerical values for each article, types of articles, and graphs.

In an environment where a plurality of edge devices 1 operate, a home screen 310 shown in FIG. 15 is displayed. In this case, it is assumed that four edge devices 1 of A device, B device, C device, and D device are arranged at an article sorting site. In the home screen 310, areas 311 to 314 are divided for each device, and buttons 315 to 318, which are the same as the buttons shown in FIG. 14, are arranged in the areas 311 to 314, respectively, and can be operated for individual devices, respectively.

When the button 304 on the home screen 300 shown in FIG. 14 is clicked, an image classification detail screen 320 (see FIG. 16) is displayed.

As shown in FIG. 16, a display region 302 of the image classification detail screen 320 is arranged with an image display area 321, buttons 322a to 322d, a metadata display column 323 for image data, a classification class name selection column 324, a registrant name selection column 325, a search target period selection column 326, a refinement button 327, a CSV output button 328, a learning start button 329, and a button 330 for returning to list page. The button 322a is a button for attaching a classification label such as "NG1" to the image data. The "NG1" indicates a classification of defective products "with damage". The button 322b is a button for attaching a classification label such as "NG2" to the image data. The "NG2" indicates a classification of "mandarin orange", which is a type different from "apple". The button 322c is a button for attaching a classification label such as "OK" to the image data. The "OK" indicates a classification into "non-defective product", for example. The button 322d is a button for attaching a classification label such as "WARNING" to the image data. The "WARNING" indicates a classification into, for example, "product need for caution" other than "NG1", "NG2", and "OK". After the selection operation of the class name button in the classification class name selection column 324 and the period specified in the search target period selection column 326, the refinement button 327 is clicked to read the target image data. The CSV output button 328 is a button for CSV output of metadata for each image data, and when being clicked, a CSV file of metadata for each image data is generated and output. The button 330 for returning to list page is a button for transitioning the screen to an image classification list screen 331 shown in FIG. 17. The image classification list screen 331 shown in FIG. 17 is provided with a menu column 301 and a display column 302 as in FIG. 16. A list of classified image data 322 is displayed in the display column 302. In a right area of the display column 302, as in FIG. 16, a classification class name selection column 324, a registrant name selection column 325, a search target period selection column 326, a refinement button 327, a CSV output button 328, a learning start button 329, and a button 330 for returning to list page are arranged. In other words, the image classification list screen 331 is a screen for the manager to browse classification results.

In the case of the second embodiment, one of unclassified image data is displayed in the image display area 321 of the image classification detail screen 320 shown in FIG. 16. Here, after the unclassified image data displayed in the image display area 321 is confirmed by the manager, any one of the buttons 322a to 322d is clicked, whereby a new evaluation of the clicked button is received by the evaluation receiving unit 75, a new classification label is attached to the image data, and the classification is regarded to be completed. After the classification, the next unclassified image data is displayed in the image display area 321. After the unclassified image data is classified, when the learning start button 329 is clicked, the classified image data is input from the evaluation receiving unit 75 to the learning unit 73 as training data, and re-learning of the AI model 61 is executed. After the re-learning, the AI model 61 is transferred from the server 2 to the edge device 1, and the AI model 31 of the edge device 1 is updated.

In the second embodiment, on the home screen 300 (FIG. 14), the home screen 310 (FIG. 15), and the image classification detail screen 320 (FIG. 16) described above, the user himself/herself can perform an operation for exhibiting the functions of the learning unit 73 and the model providing unit 74. For example, the user such as a manager can allow the AI model 61 to learn sample image data to construct the AI model 61, and can allow the constructed AI model 61 to re-learn, whereby the user can verify the accuracy using learning data and test data.

Data collection and tuning work for re-learning the AI model 61 are generally difficult, and collection of image data for defective products is particularly important. When the edge device 1 tries to pick up only image data for defective products, it is difficult to improve the accuracy of the AI model 31 by collecting only those that the AI model 31 determines to be NG. The image data, which is really necessary, is image data for non-defective products or defective products that the AI model 31 erroneously determines, and it is necessary to correctly attach a label to the image data for learning. Specifically, there is a case of obtaining image data for articles such as products that are determined to be defective products (for example, image data determined to be defective products with a probability of 50%)

closer to non-defective products or unknown products such as non-defective product that seem to be specific defects (for example, small cracks, chips, scratches, and other abnormalities in parts), and analyzing such image data is important for improving sorting accuracy. In order to correctly attach a label to the image data for learning, it is necessary to set the classification of raw data separately from the determination result of the AI model 31, and in the present embodiment, assuming that the AI model 31 outputs a probability value of defective products, it is possible to correctly attach a label to the image data for learning using the probability value.

In other words, according to the second embodiment, the determination unit 42 of the edge device 1 determines whether the predetermined condition is satisfied, using the second condition of belonging the third category (for example, the quality is unknown: unknown product) in addition to the first condition of belonging the second category (defective product). The unknown product means a product whose determination of quality is unknown, with a probability value of defective products being about 50% to 70%, for example. The probability value may be obtained based on the result of similarity calculation obtained by comparison of the image data for the genuine product with the image data to be processed, instead of using the output of the AI model 31. The probability value of about 50% to 70% is an example, and the probability value may be other values or any ambiguous numerical value that makes it difficult to identify the quality. Then, when the determination unit 42 determines that the second condition is satisfied, the image data to be processed is output to the server 2 together with information of the third category (for example, unknown product) as the determination result.

In the server 2, the third category (for example, unknown product) and the image data to be processed are transmitted to the manager terminal 3, the quality of the image data to be processed is determined by eyes of a person such as a manager, and the classification label of the image data to be processed is attached to the correct discrimination result again to make the AI model 31 to learn, whereby it is possible to reduce erroneous determination by the AI model 31 and improve the sorting accuracy.

There is also a method of determining the image distribution itself of original data and classifying it semi-automatically, but it is possible to collect optimal image data for re-learning by preparing an algorithm for collecting data for re-learning (a function for determining articles belonging to the third category) separately from the determination by the AI model 31.

Furthermore, an inspector who is actually on site can more readily sort between articles whose quality is ambiguous than a software engineer. For this reason, when the image classification detail screen 320 (see FIG. 16) is provided in the manager terminal 3 at the site such that the manager (user) can easily classify (sort) images, the manager (user) can easily make the AI model 61 to re-learn and reflect it in the AI model 31 on the edge device 1 at a predetermined timing.

In addition, since the user is equipped with a function that allows the AI model 61 to learn as it is after the image classification on the image classification detail screen 320 (see FIG. 16), the user can classify the image data uploaded to the server 2 by tagging (attaching a classification label) what is defective or non-defective product. Further, the server 2 can perform re-learning by using the data set after classification. Furthermore, the image classification detail screen 320 (GUI screen) is prepared such that the user can make construction and re-learning of the AI model 61, the accuracy can be verified using the learning data and the test data, and thus a system can be provided in which the learned AI model 61 constructed and re-learned can be remotely implemented in the edge device 1 as it is. In other words, the user can collect and classify the data necessary for re-learning, and repeat a cycle of deploying the AI model 61 with improved accuracy to the edge device 1 and using it. Additionally, even when a new product comes out or when the user copes with a new lot, it is possible to cope with it without trouble.

Although the embodiments of the information processing system according to the present invention has been described above, the embodiments according to the present invention may be as follows, for example. Although the edge device 1 includes the camera 22 in the above-described embodiments, the camera 22 may be a camera connected to the edge device 1, that is, an external camera.

In the above-described embodiments, the AI model 31 receives the image data regarding the products T1 to Tn, and outputs the sorting result for the products T1 to Tn, but other models may be used, or any model may be used without being limited to the AI model or the sorting processing as long as inputting image data regarding an article and outputting a predetermined processing result for the article.

In the above-described embodiments, although the determination unit 42 determines whether the condition of belonging to the defective product category is satisfied, a condition of not belonging to the normal product may be used regardless of such a condition, and setting of the condition can be changed in various ways. In other words, it may be determined whether the predetermined processing result output from the model as a result of inputting the image data to be processed into the model satisfies a predetermined condition.

In the above-described embodiments, when the determination unit 42 determines that the condition of belonging to the defective product category is satisfied, the output control unit 43 outputs the image data for the product T2 determined to belong to the defective product to the external device together with the NG text data, and when the determination unit 42 determines that the condition of belonging to the defective product category is not satisfied, the output control unit 43 executes the control to output only the OK text data to the external device, but it does not have to be a two-way selection of NG and OK, for example, it may be may be graded (three or more types), for example, a confidence level of 80% or more, a confidence level of less than 80% and more than 60%, and a confidence level of 60% or less. In other words, when the determination unit 42 determines that the predetermined condition is satisfied, the output control unit 43 may execute the control to output the image data to be processed to the external device together with the determination result, and when the determination unit 42 determines that the predetermined condition is not satisfied, the output control unit 43 may execute the control to output only the determination result to the external device.

In the above-described embodiments, although the server 2 is provided with a learning function (the learning unit 73 or the sorting information DB 62 storing the image data for defective products), the present invention is not limited thereto, the learning function may be installed in another information processing device, for example, a learning device different from the server 2, and the server 2 and the learning device may be connected to each other via the network N to realize a function of data cooperation. In the information processing system, each of the functions is independent, whereby when the service stops for some reasons, it can cope with the situation by restoring only a specific function without stopping the entire service.

In the above-described embodiments, although one edge device 1 is arranged on one manufacturing line L, one edge device 1 may be arranged on each of a plurality of manufacturing lines, or each of edge devices 1 may be arranged at each of a plurality of locations on one manufacturing line L. In this case, an ID (unique identification information) is assigned to each of the plurality of edge devices 1, and thus the operating status of each of the edge devices 1 can be managed.

In the above-described embodiments, although the server 2 on the network N or the PLC at the manufacturing site is the destination to which the output control unit 43 of the edge device 1 transmits the prediction result as output information, when my page of the website is specified as the destination, the output control unit 43 may execute control to save the output information in my page.

In addition, the server 2 publishes application software dedicated to this service (hereinafter, referred to as "application") on the Internet, and causes the edge device 1 or other information processing devices to download and execute the application, whereby the edge device 1 or other information processing devices can realize the same functions as the server 2 shown in the above-described embodiments.

In the above-described embodiments, although the AI model 31 is retained in the edge device 1 and the sorting processing is performed, the AI model 31 may be incorporated into a device, which acquires input information, for example, the camera 22 that is an acquisition source of the input information or a recording device that records the image data captured by the camera 22.

In the above-described embodiments, the image data is used as the input information to be input to the AI model 31, but data such as voice, text, table, numerical value, and other data may be used as input information. In the above-described embodiments, the example has been described in which the edge device 1 and the PLC installed at the manufacturing site cooperate to output an alert when defective products are detected in the edge device 1, but an alert may be output in cooperation with a buzzer or a lamp in addition to the PLC.

For example, the series of processing described above can be executed by hardware or by software. In other words, the functional configuration of FIG. 3 is merely an example and is not particularly limited. In other words, it suffices when the information processing system is equipped with a function capable of executing the above-described series of processing as a whole, and what kind of functional blocks and database are used to realize this function is particularly limited to the example shown in FIG. 3. In addition, the locations where the functional blocks are provided are not particularly limited to those shown in FIG. 3, and may be discretionary. For example, the functional blocks and database of the server 2 may be transferred to the manager terminal 3. Further, one functional block and database may be constituted by a single piece of hardware, a single piece of software, or a combination thereof.

For example, in a case in which a series of processing is executed by software, a program constituting the software is installed in a computer or the like from a network or a recording medium. The computer may be a computer incorporated in dedicated hardware. Further, the computer may be a computer capable of executing various functions by installing various programs, for example, a general-purpose smart phone or a personal computer in addition to the management server.

For example, the recording medium including such a program is not only configured by removable media (not shown) distributed separately from the main body of the device in order to provide the program to the service provider SA, but may also be installed in the main body of the device in advance.

In this description, steps describe a program recorded in a recording medium include not only processes which are chronologically performed in the order but also processes which are performed in parallel or individually although not necessarily performed chronologically. Further, in this description, a term "system" indicates the entire apparatus constituted by a plurality of devices, a plurality of units, or the like.

In other words, the information processing device according to the present invention can take various embodiments having the following configurations.

In other words, a first information processing device (for example, the edge device 1 in FIG. 3) according to the present invention includes:

a model retaining unit (for example, the storage unit 18 in FIG. 3) that retains a model (for example, for example, the AI model 31 in FIG. 3) to which image data regarding articles (for example, products T1 to Tn in FIG. 3) is input and from which a predetermined processing result (sorting result) for the article is output;

an image acquisition unit (for example, the image acquisition unit 41 in FIG. 3) that acquires, as image data to be processed, image data (for example, images of the products T1 to Tn in FIG. 3) regarding an article to be processed;

a determination unit (for example, the determination unit 42 in FIG. 3) that determines whether the predetermined processing result output from the model as a result of inputting the image data to be processed to the model satisfies a predetermined condition (for example, a condition of belonging to a category of defective products); and an output control unit (for example, the output control unit 43 in FIG. 3) that executes control to output the image data to be processed (for example, the image data for the product T2) to an external device together with a determination result (for example, text data such as NG) when the determination unit determines that the predetermined condition (for example, the condition of belonging to a category of defective products) is satisfied, and to output only a determination result (for example, text data such as OK) to the external device when the determination unit determines that the predetermined condition (for example, the condition of belonging to a category of defective products) is not satisfied. In this way, the AI model 61 of the server 2, which is the second information processing device, deploys as the AI model 31 of the edge device 1, which is the first information processing device, and the edge device 1 is configured to sort the category of the image data using the AI model 31, to determine whether the sorted category satisfies the condition of being a specific category, and to control the information to be transmitted to the server 2 in response to the determination result, whereby the majority of image data sorted as normal products are not sent from the edge device 1 to the server 2, only a small amount of image data sorted as defective products is sent to the server 2, and thus it is possible to reduce the volume of data flowing through the network N, to reduce the consumption of the communication resources, and to reduce operation costs. In addition, since the server 2 automatically collects only the image data for defective products, the AI model 61 is re-learned using the image data to improve the recognition knowledge of the AI model 61, whereby it is possible to improve the sorting accuracy for identifying images of defective products from the images of the articles acquired sequentially. As a result, it is possible to reduce costs by reducing the transfer capacity of the network N, that is, the consumption of communication resources, while cooperating different locations (for example, the manufacturing site and the location of the management department) using the network N, and to improve the sorting accuracy.

The model (for example, the AI model 31) outputs, as the predetermined processing result (for example, the sorting result of the product T2), a category (for example, a category of defective products) to which the article belongs among a plurality of categories (a category of normal products and a category of defective products), and the determination unit (for example, the determination unit 42 in FIG. 3) determines whether the predetermined condition is satisfied, using a condition of belonging to a predetermined category (for example, a category of defective products) as the predetermined condition. In this way, the server 2 can collect only the image data for defective products by determining whether to transmit the sorting result of the image data by the AI model 31 under the condition of belonging to the category of defective products, for example.

The plurality of categories includes a first category indicating a non-defective product and a second category indicating a defective product, and the determination unit (for example, the determination unit 42 in FIG. 3) determines whether the predetermined condition is satisfied, using a first condition of belonging to the second category (defective product) as the predetermined condition. In this way, only the image data to be processed belonging to the second category (defective product) is transmitted to the server 2, and the consumption of communication resources can be reduced.

The plurality of categories further includes a third category (for example, a determination of quality is unknown, with a probability value of defective products being about 50% to 70%, or vice versa) indicating that the non-defective product and the defective product are difficult to be distinguished, the determination unit (for example, the determination unit 42 in FIG. 3) determines whether the predetermined condition is satisfied, using a second condition of belonging to the third category (for example, the determination of quality is unknown) in addition to the first condition as the predetermined condition, and the output control unit (for example, the output control unit 43 in FIG. 3) is configured to: output the image data to be processed to the external device together with information of the second category (defective product) as a determination result when the determination unit (for example, the determination unit 42 in FIG. 3) determines that the first condition is satisfied, output the image data to be processed to the external device together with information of the third category (for example, the determination of quality is unknown) as a determination result when the determination unit (for example, the determination unit 42 in FIG. 3) determines that the second condition is satisfied, and output only a determination result to the external device when the determination unit (for example, the determination unit 42 in FIG. 3) determines that neither the first condition nor the second condition is satisfied. In this way, when it is determined that the second condition (the condition of belonging to the third category) is satisfied, the image data to be processed is output to the external device (for example, the server 2 in FIG. 3) together with the information of the third category (for example, the determination of quality is unknown) as the determination result, whereby the quality of the image data to be processed is sorted by eyes of a person, the classification label of the image data to be processed is attached again to make the AI model to learn, and thus it is possible to reduce erroneous determination by the AI model and improve the sorting accuracy.

A second information processing device (for example, the server 2 in FIG. 3) includes: a learning unit (for example, the learning unit 73 in FIG. 3) that performs re-learning on the model (for example, the AI model 61 in FIG. 3), using the image data to be processed (for example, the image data for defective products) and the processing result (for example, text data such as NG) output from the first information processing device (for example, the edge device 1 in FIG. 3); and a providing unit (for example, the model providing unit 74 in FIG. 3) that provides the model (the AI model 61) subjected to the re-learning to the first information processing device (for example, the edge device 1 in FIG. 3). Thus, the model (for example, the AI model 61) re-learns only the image data to be processed (for example, the image data for defective products) acquired from the manufacturing site to improve the identification knowledge for the defective products, and then is provided to the information processing device (for example, the edge device 1) on the manufacturing site, whereby the image data can be sorted by the intelligent model (for example, the AI model 31) that has been learned in the information processing device (for example, the edge device 1), and the accuracy of sorting out the defective products from articles can be improved.

The second information processing device further includes an evaluation receiving unit (for example, the evaluation receiving unit 75 in FIG. 13) that receives an evaluation of a user for the image data to be processed and the processing result, and the learning unit (for example, the learning unit 73 in FIG. 3) performs the re-learning on the model, using the evaluation of the user in addition to the image data to be processed and the processing result. In this way, the AI model is re-learned using the user's evaluation (feedback of the image data (training data) to which the classification label is attached again due to incorrect recognition by the AI model) in addition to the image data to be processed and the processing result, whereby it is possible to reduce the amount of data for which determination of quality is unclear during sorting and to improve the sorting accuracy.

The second information processing device further includes a control unit (for example, the GUI control unit 76 in FIG. 13) that executes control to provide a user interface for causing the user to perform an operation for exhibiting functions of the learning unit (for example, the learning unit 73 in FIG. 3) and the providing unit (for example, the model providing unit 74 in FIG. 3), to another information processing device (for example, the manager terminal 3 in FIG. 13) operated by the user. Thus, for example, the user himself/herself can perform the operation for exhibiting the functions of the learning unit (for example, the learning unit 73 in FIG. 3) and the providing unit (for example, the model providing unit 74 in FIG. 3), from the user interface of another information processing device (for example, the manager terminal 3 in FIG. 13) installed at the site. For example, the user can construct the AI model from the user interface, re-learn the constructed AI model, and verify the accuracy using the learning data and the test data. As a result, it is possible to provide a system in which the learned AI model created by the user via the user interface and saved in the server constructed and re-learned can be remotely implemented in another information processing device (for example, the edge device 1 in FIG. 3).

The second information processing device (for example, the server 2 in FIG. 3) further includes a presentation unit (for example, the model providing unit 74 in FIG. 3) that generates information (for example, also including the image data to be processed, the processing result itself, and an alert at the time of detection of defective products in addition to the real-time determination screen 111 in FIG. 5) regarding the article to be processed using the image data to be processed (for example, the image data for defective products) and the processing result (for example, text data such as NG) output from the first information processing device (for example, the edge device 1 in FIG. 3) and presents the information to another information processing device (for example, the manager terminal 3 in FIG. 3). Thus, since the manager in a remote location away from the site where the article is placed can confirm the situation of the article at the site, thereby facilitating business cooperation between different locations.

EXPLANATION OF REFERENCE NUMERALS

T1 to T3 . . . product, L . . . manufacturing line, 1 . . . edge device, 2 . . . server, 3 . . . manager terminal, 11, 51, 91 . . . CPU, 18, 58, 98 . . . storage unit, 19, 59, 99 . . . communication unit, 31, 61 . . . AI model, 41 . . . image acquisition unit, 42 . . . determination unit, 43 . . . output control unit, 62 . . . sorting information DB, 71 . . . presentation unit, 72 . . . model generator, 73 . . . learning unit, 74 . . . model providing unit, 75 . . . evaluation receiving unit, 76 . . . GUI control unit, 81 . . . visualization unit, 82 . . . alert unit, 96 . . . output unit, 101 . . . browsing control unit It is claimed:

1. An information processing device configured to selectively transmit image data to be sorted over a network comprising:

a camera configured to acquire image data; and a first processor coupled to a first storage unit, the first processor being configured to use a first model stored in the first storage unit on the image data, wherein the information processing device is communicatively connected with a server via the network, the server comprising a second processor coupled to a second storage unit, the second processor being configured to use a second model stored in the second storage unit, wherein the first processor is configured to cause the information processing device to perform a method comprising:

using the camera, sequentially assigning each of a plurality of articles to be processed and sequentially acquiring image data for each of the plurality of articles;

inputting the image data to be processed for each of the plurality of articles into the first model, the first model being configured to provide, based on the image data, a processing result output that indicates whether each of the plurality of articles satisfies a sorting condition;

determining, for each of the plurality of articles to be processed, whether the processing result output from the first model satisfies the sorting condition;

transmitting, to the server via the network, a first text data, corresponding identification information, and the image data to be processed in response to a first determination that is determined to satisfy the sorting condition;

transmitting, to the server via the network, a second text data and corresponding identification information, without the image data to be processed in response to a second determination that is determined not to satisfy the sorting condition, wherein the image data is configured to be accepted by the second processor of the server for re-learning against the second model, and receiving, at a predetermined timing, the second model that has re-learned, and updating the first model, wherein at the information processing device, the first processor is configured to cause the information processing device to perform the method using the first model updated to the second model that has re-learning after the information processing device receives the second model that has re-learned.

2. The information processing device according to claim 1, wherein the first model is configured to output, as the processing result, a category to which the article belongs among a plurality of categories, and in the determining, for each of the plurality of articles to be processed, the first processor is configured to cause the information processing device to determine whether the sorting condition is satisfied, using a condition of belonging to a predetermined category as the sorting condition.

3. The information processing device according to claim 2, wherein the plurality of categories includes a first category indicating a non-defective product and a second category indicating a defective product, and in the determining, for each of the plurality of articles to be processed, the first processor is configured to cause the information processing device to determine whether the sorting condition is satisfied, using a first condition of belonging to the second category as the sorting condition.

4. The information processing device according to claim 3, wherein the plurality of categories further includes a third category indicating that the non-defective product and the defective product are difficult to be distinguished, in the determining, for each of the plurality of articles to be processed, the first processor is configured to cause the information processing device to determine whether the sorting condition is satisfied, using a second condition of belonging to the third category in addition to the first condition as the sorting condition, and wherein in the transmitting, to the server via the network, the first text data, at least one of information of the second category that satisfies the first condition and information of the third category that satisfies the second condition is included in the first text data.

5. The information processing device according to claim 1, wherein the first processor is configured to cause the information processing device to receive, from an outside via the network:

an evaluation to the first text data, the corresponding identification information, and the image data to be processed, or a change in the sorting condition associated with the first text data, the corresponding identification information, and the image data to be processed, to promote re-learning for the second model.

6. The information processing device according to claim 5, wherein the evaluation of the first text data, the corresponding identification information, and the image data to be processed, or the change in the sorting condition, is configured to be accepted via a graphical user interface provided on the server or another information processing device.

7. An information processing method executed by an information processing device configured to selectively transmit image data to be sorted over a network, the method comprising:

retaining a first model to which the image data regarding an article is input and from which a processing result for the article is output, wherein the information processing device is communicatively connected with a server via the network, the server retaining a second model for updating the first model;

sequentially assigning each of a plurality of articles to be processed and sequentially acquiring image data for each of the plurality of articles;

inputting the image data to be processed for each of the plurality of articles into the first model, the first model being configured to provide, based on the image data, a processing result output that indicates whether each of the plurality of articles satisfies a sorting condition;

determining, for each of the plurality of articles to be processed, whether the processing result output from the first model satisfies the sorting condition;

transmitting, to the server via the network, a first text data, corresponding identification information, and the image data to be processed in response to a first determination that is determined to satisfy the sorting condition;

transmitting, to the server via the network, a second text data and corresponding identification information, without the image data to be processed in response to a second determination that is determined not to satisfy the sorting condition, wherein the image data is accepted by the server for re-learning against the second model; and receiving, at a predetermined timing, the second model that has re-learned, and updating the first model, wherein at the information processing device, the information processing method is executed using the first model that has been updated to the second model that has been re-learned.

8. A non-transitory computer readable medium storing a program causing a computer, which controls an information processing device, to execute a control processing comprising:

retaining a first model to which image data regarding an article is input and from which a processing result for the article is output;

wherein the information processing device is communicatively connected with a server via a network, the server retaining a second model for updating the first model, sequentially assigning each of a plurality of articles to be processed and sequentially acquiring image data for each of the plurality of articles;

inputting the image data to be processed for each of the plurality of articles into the first model, the first model being configured to provide, based on the image data, a processing result output that indicates whether each of the plurality of articles satisfies a sorting condition;

determining, for each of the plurality of articles to be processed, whether the processing result output from the first model satisfies the sorting condition;

transmitting, to the server via the network, a first text data, corresponding identification information, and the image data to be processed in response to a first determination that is determined to satisfy the sorting condition;

transmitting, to the server via the network, a second text data and corresponding identification information, without the image data to be processed in response to a second determination that is determined not to satisfy the sorting condition, wherein the image data is accepted by the server for re-learning against the second model, and receiving, at a predetermined timing, the second model that has re-learned, and updating the first model, wherein at the information processing device, the control processing is executed using the first model that has been updated to the second model that has been re-learned.

* * * * *